US012681608B2

(12) United States Patent
Lee

(10) Patent No.: US 12,681,608 B2
(45) Date of Patent: Jul. 14, 2026

(54) INPUT SENSING DEVICE AND ELECTRONIC DEVICE INCLUDING THE SAME

(71) Applicant: Samsung Display Co., Ltd., Yongin-si (KR)

(72) Inventor: Choonhyop Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/071,615

(22) Filed: Mar. 5, 2025

(65) Prior Publication Data

US 2026/0010267 A1     Jan. 8, 2026

(30) Foreign Application Priority Data

Jul. 3, 2024    (KR) ........................ 10-2024-0087325

(51) Int. Cl.
G06F 3/044 (2006.01)

(52) U.S. Cl.
CPC .................................. G06F 3/0443 (2019.05)

(58) Field of Classification Search
CPC .................................................... G06F 3/0443
See application file for complete search history.

(56) References Cited

U.S. PATENT DOCUMENTS

| 11,537,252 B2 | 12/2022 | Lee et al. |
| 11,983,357 B2 | 5/2024 | Kim et al. |

| 2014/0347284 A1* | 11/2014 | Lee ........................ G06F 3/0446 |
| | | 345/173 |
| 2015/0153900 A1* | 6/2015 | Chang ................. G06F 3/04186 |
| | | 345/174 |
| 2020/0192545 A1* | 6/2020 | Oh ......................... G06F 1/1688 |
| 2022/0050569 A1* | 2/2022 | Kim ....................... G06F 3/0412 |
| 2023/0004274 A1 | 1/2023 | Shin et al. |
| 2023/0043817 A1* | 2/2023 | Lee ..................... G06F 3/04166 |
| 2023/0125764 A1* | 4/2023 | Kim ....................... G06F 1/1643 |
| | | 345/173 |
| 2023/0147349 A1* | 5/2023 | Park ....................... G09G 5/006 |
| | | 345/174 |

(Continued)

FOREIGN PATENT DOCUMENTS

| KR | 10-2017-0046555 A | 5/2017 |
| KR | 10-2022-0021064 A | 2/2022 |

(Continued)

*Primary Examiner* — Amy Onyekaba
(74) *Attorney, Agent, or Firm* — Womble Bond Dickinson (US) LLP

(57)     ABSTRACT

Disclosed is an input sensor of an electronic device including a sensor layer including first electrodes and second electrodes, and a sensor driver electrically connected to the second electrodes, and configured to provide transmission signals to the first electrodes, output a first reception signal based on sensing signals received from ones of the second electrodes of a first location, which are adjacent to each other, output a second reception signal based on one of the sensing signals received from one of the ones of the second electrodes of the first location, and another sensing signal received from another one of the second electrodes of a second location, and change a frequency of the transmission signals based on the first reception signal and the second reception signal.

20 Claims, 18 Drawing Sheets

(56)             References Cited

U.S. PATENT DOCUMENTS

| | | | |
|---|---|---|---|
| 2023/0185401 A1 * | 6/2023 | Lee | G06F 3/0445 |
| | | | 345/173 |
| 2023/0360589 A1 * | 11/2023 | An | G09G 3/2096 |
| 2023/0377524 A1 * | 11/2023 | Song | G09G 3/3233 |
| 2024/0004499 A1 * | 1/2024 | Kim | G06F 3/0447 |
| 2025/0123708 A1 * | 4/2025 | Ono | G01R 27/2605 |

FOREIGN PATENT DOCUMENTS

| | | |
|---|---|---|
| KR | 10-2022-0133917 A | 10/2022 |
| KR | 10-2023-0004176 A | 1/2023 |

* cited by examiner

RX1~RXs : RX

INPUT SENSING DEVICE AND ELECTRONIC DEVICE INCLUDING THE SAME

CROSS-REFERENCE TO RELATED APPLICATION

The present application claims priority to, and the benefit of, Korean Patent Application No. 10-2024-0087325, filed on Jul. 3, 2024, in the Korean Intellectual Property Office, the entire disclosure of which is incorporated herein by reference.

BACKGROUND

Embodiments of the present disclosure described herein relate to an electronic device including an input sensor.

Each of multimedia electronic devices, such as a TV, a mobile phone, a tablet personal computer (PC), a navigation system, a game console, and the like, can display images. In addition to a general input method, such as a button, a keyboard, a mouse, or the like, an electronic device may provide a touch-based input method that allows a user to enter information or commands easily and intuitively.

SUMMARY

Embodiments of the present disclosure provide an input sensor capable of more accurately detecting a user input, and an electronic device including the same.

According to one or more embodiments, an input sensor includes a sensor layer including first electrodes and second electrodes, and a sensor driver electrically connected to the second electrodes, and configured to provide transmission signals to the first electrodes, output a first reception signal based on sensing signals received from ones of the second electrodes of a first location, which are adjacent to each other, output a second reception signal based on one of the sensing signals received from one of the ones of the second electrodes of the first location, and another sensing signal received from another one of the second electrodes of a second location, and change a frequency of the transmission signals based on the first reception signal and the second reception signal.

The sensor driver may include a first switching circuit configured to sequentially output the sensing signals received from the ones of the second electrodes of the first location, and a first receiver configured to output the first reception signal corresponding to a difference between the sensing signals output by the first switching circuit.

The sensor driver further may include a second switching circuit configured to sequentially output signals including the one of the sensing signals received from the one of the ones of the second electrodes of the first location and the another sensing signal received from the another one of the second electrodes of the second location, and a second receiver configured to output the second reception signal corresponding to a difference between the signals output by the second switching circuit.

The sensor driver may be configured to change the frequency of the transmission signals when the second reception signal is greater than the first reception signal.

The sensor driver may further include a third switching circuit configured to sequentially output other signals including the another sensing signal received from the another one of the second electrodes of the second location and an additional sensing signal received from an additional one of the second electrodes of a third location, and a third receiver configured to output a third reception signal corresponding to a difference between the other signals output by the third switching circuit, wherein the third location is between the first location and the second location.

The sensing signals may be analog signals, wherein the first reception signal and the second reception signal include digital signals.

The sensor driver may further include a signal generation circuit configured to output the transmission signals, a reception circuit configured to receive the sensing signals from the second electrodes, and to output the first reception signal and the second reception signal based on the sensing signals, and a sensor controller configured to control the signal generation circuit such that the frequency of the transmission signals is changed based on the first reception signal and the second reception signal.

The sensor layer may include a first sensing area and a second sensing area, wherein the sensor driver is configured to provide first transmission signals to the first sensing area, and is configured to provide second transmission signals to the second sensing area, wherein the first transmission signals have a first transmission frequency, and wherein the second transmission signals have a second transmission frequency that is different from the first transmission frequency.

The sensor driver may be configured to change the frequency of the transmission signals when the second reception signal is greater than the first reception signal based on the sensing signals received from reference area second electrodes of the second electrodes in a reference area and the sensing signals received from boundary area second electrodes of the second electrodes in a boundary area, wherein the boundary area overlaps a part of the first sensing area and a part of the second sensing area.

The sensor driver may be configured to change at least one frequency of the first transmission frequency and the second transmission frequency when the second reception signal is greater than the first reception signal and when a representative value of the sensing signals received from the boundary area second electrodes is greater than a representative value of the sensing signals received from the reference area second electrodes.

According to one or more embodiments, an electronic device includes a display layer configured to display an image, a sensor layer above the display layer, and first electrodes and second electrodes, and a sensor driver electrically connected to the second electrodes, and configured to provide transmission signals to the first electrodes, output a first reception signal based on sensing signals received from ones of the second electrodes of a first location, which are adjacent to each other, output a second reception signal based on one of the sensing signals received from one of the ones of the second electrodes of the first location, and another sensing signal received from another one of the second electrodes of a second location, and change a frequency of the transmission signals based on the first reception signal and the second reception signal.

The sensor driver may include a first switching circuit configured to sequentially output the sensing signals received from the ones of the second electrodes of the first location, and a first receiver configured to output the first reception signal corresponding to a difference between the sensing signals output by the first switching circuit.

The sensor driver may further include a second switching circuit configured to sequentially output signals including the one of the sensing signals received from the one of the ones of the second electrodes of the first location and the another sensing signal received from the another one of the second electrodes of the second location, and a second receiver configured to output the second reception signal corresponding to a difference between the signals output by the second switching circuit.

The sensor driver may be configured to change the frequency of the transmission signals when the second reception signal is greater than the first reception signal.

The sensor driver may further include a third switching circuit configured to sequentially output other signals including the another sensing signal received from the another one of the second electrodes of the second location and an additional sensing signal received from an additional one of the second electrodes of a third location, and a third receiver configured to output a third reception signal corresponding to a difference between the other signals output by the third switching circuit, wherein the third location is between the first location and the second location.

First ends of second signal wires may be electrically connected to the sensor driver, wherein the first location is adjacent to the first ends of the second signal wires, and wherein the second location is not adjacent to the first ends of the second signal wires.

The sensor driver may further include a signal generation circuit configured to output the transmission signals, a reception circuit configured to receive the sensing signals from the second electrodes, and to output the first reception signal and the second reception signal based on the sensing signals, and a sensor controller configured to control the signal generation circuit such that the frequency of the transmission signals is changed based on the first reception signal and the second reception signal.

The sensor layer may include a first sensing area and a second sensing area, wherein the sensor driver is configured to provide first transmission signals to the first sensing area, and is configured to provide second transmission signals to the second sensing area, wherein the first transmission signals have a first transmission frequency, and wherein the second transmission signals have a second transmission frequency that is different from the first transmission frequency.

The sensor driver may be configured to change the frequency of the transmission signals when the second reception signal is greater than the first reception signal based on the sensing signals received from reference area second electrodes of the second electrodes in a reference area and the sensing signals received from boundary area second electrodes of the second electrodes in a boundary area, wherein the boundary area overlaps a part of the first sensing area and a part of the second sensing area.

The sensor driver may be configured to change at least one frequency of the first transmission frequency and the second transmission frequency when the second reception signal is greater than the first reception signal and when a representative value of the sensing signals received from the boundary area second electrodes is greater than a representative value of the sensing signals received from the reference area second electrodes.

BRIEF DESCRIPTION OF THE DRAWINGS

The above and other aspects of the present disclosure will become apparent by describing in detail embodiments thereof with reference to the accompanying drawings.

FIGS. 8A, 8B, 80, 8D, 8E, and 8F are diagrams showing sensing signals according to frequencies of transmission signals.

FIG. 12 is a diagram showing sensing signals received from a partial area of the sensor layer illustrated in FIG. 11.

DETAILED DESCRIPTION

Figure 1:
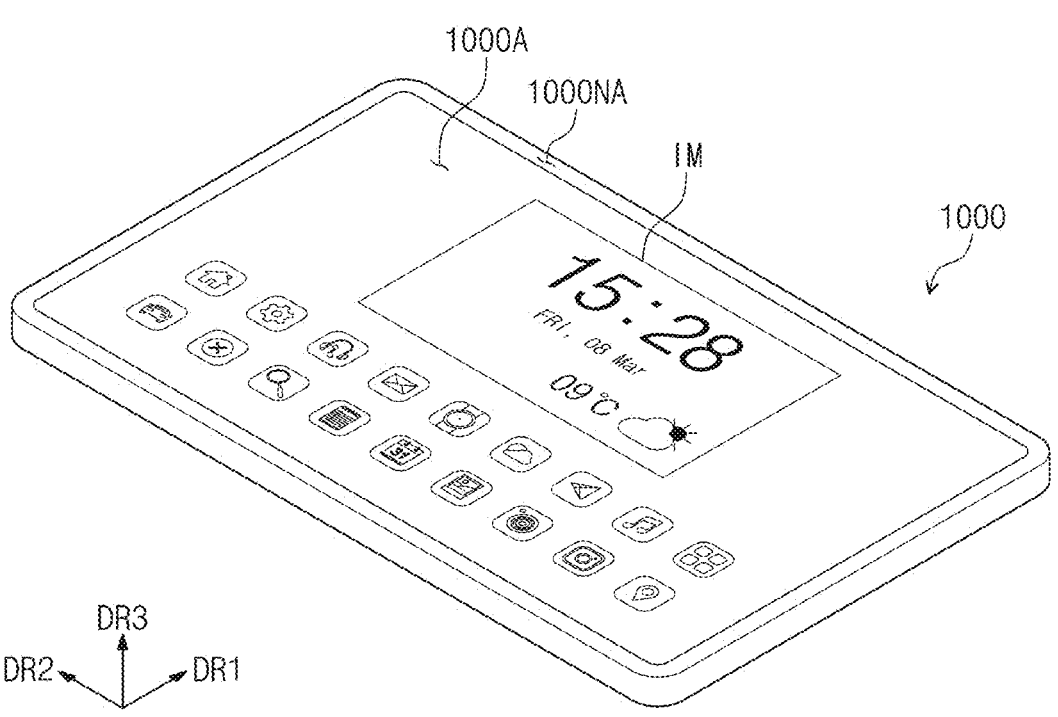
FIG. 1 is a perspective view illustrating an electronic device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view illustrating an electronic device 1000, according to one or more embodiments of the present disclosure.

Referring to FIG. 1, the electronic device 1000 may be a device that is activated depending on an electrical signal to display an image. For example, the electronic device 1000 may be a mobile phone, a tablet, a car navigation system, a game console, a notebook computer, or a wearable device, but is not limited thereto.

A display area 1000A and a peripheral area 1000NA may be defined in the electronic device 1000. The electronic device 1000 may display an image through the display area 1000A. The display area 1000A may include a plane defined by a first direction DR1 and a second direction DR2. The peripheral area 1000NA may surround the periphery of the display area 1000A (e.g., in plan view). In one or more embodiments of the present disclosure, the peripheral area 1000NA may be omitted.

A thickness direction of the electronic device 1000 may be parallel to a third direction DR3 crossing the first direction DR1 and the second direction DR2. Accordingly, front surfaces (or upper surfaces) and back surfaces (or lower surfaces) of members constituting the electronic device 1000 may be defined based on the third direction DR3.

The electronic device 1000 may display an image IM in the third direction DR3. The image IM may include a still image as well as a moving image. In FIG. 1, a clock and icons are illustrated as an example of the image IM.

The electronic device 1000 may detect inputs applied from the outside of the electronic device 1000. The external inputs may include various types of external inputs, such as a portion of a user's body, light, heat, pressure, or the like. The electronic device 1000 illustrated in FIG. 1 may detect an input by the user's touch.

The electronic device 1000 according to one or more embodiments is a device for displaying a video or still image, and may be used as a display screen for various products, such as television, laptops, monitors, billboards, Internet of Things (IoTs), as well as portable electronic devices, such as mobile phone, smart phone, smart pad, tablet personal computer (PC), mobile communication terminal, electronic notebook, electronic book, portable multimedia player PMP, personal digital assistant PDA, MP3 player, navigation system, and ultra mobile PC UMPC. In addition, the electronic device 1000 according to one or more embodiments may be used in wearable devices, such as smart watches, watch phones, glasses-type displays, head-mounted displays HMDs, virtual reality (VR) devices, or augmented reality (AR) devices. In addition, the electronic device 1000 according to one or more embodiments may be used as a dashboard of a vehicle, a center information display (CID) located in a center fascia or a dashboard of the vehicle, a room mirror display replacing a side mirror of the vehicle, an entertainment element for a rear seat of the vehicle, and a display located on a rear surface of the front seat.

Figure 2:
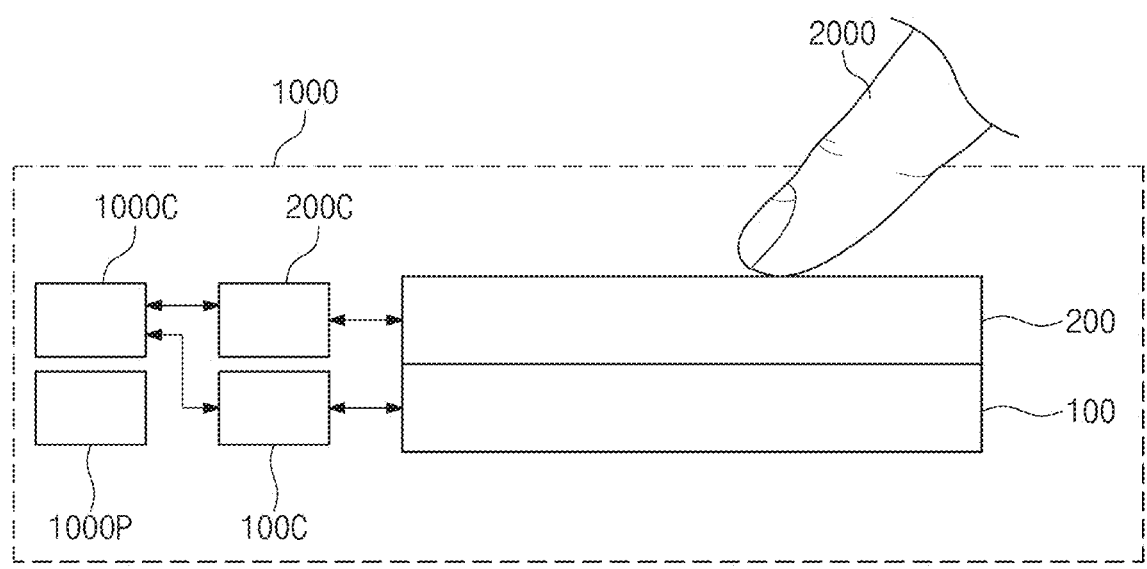
FIG. 2 is a block diagram schematically illustrating an electronic device, according to one or more embodiments of the present disclosure.

FIG. 2 is a block diagram schematically illustrating the electronic device 1000, according to one or more embodiments of the present disclosure.

Referring to FIG. 2, the electronic device 1000 may include a display layer 100, a sensor layer 200, a display driver 100C, a sensor driver 200C, and a main controller 1000C.

The display layer 100 may be a configuration that substantially generates an image. The display layer 100 may be a light-emitting display layer. For example, the display layer 100 may be an organic light-emitting display layer, an inorganic light-emitting display layer, an organic-inorganic light-emitting display layer, a quantum dot display layer, a micro-LED display layer, or a nano-LED display layer.

The sensor layer 200 may be located on the display layer 100 (as used herein, "located on" may mean "above"). The sensor layer 200 may sense an external input (e.g., a user's touch input) applied from the outside. The external input may be an input means capable of providing a change in the capacitance of the sensor layer 200 or an input means capable of causing an induced current in the sensor layer 200.

The main controller 1000C may control overall operations of the electronic device 1000. For example, the main controller 1000C may control operations of the display driver 100C and the sensor driver 200C. The main controller 1000C may include at least one microprocessor and may further include a graphics controller. The main controller 1000C may be referred to as an "application processor", "central processing unit", or "main processor".

The display driver 100C may drive the display layer 100. The display driver 100C may receive input image signal RGB (see FIG. 5) and a control signal CTRL (see FIG. 5) from the main controller 1000C. The control signal CTRL may include various signals. The display driver 100C may generate control signals (e.g., a scan control signal GCS and a data control signal DCS (see FIG. 5)) for controlling the timing for providing signals to the display layer 100 based on the control signal CTRL.

The sensor driver 200C may drive the sensor layer 200. The sensor driver 200C may receive a control signal I-CS (see FIG. 6) from the main controller 1000C. The control signal I-CS may include the clock signal of the sensor driver 200C.

The sensor driver 200C may be implemented as an integrated circuit (IC) and may be electrically connected to the sensor layer 200. For example, the sensor driver 200C may be mounted on a separate printed circuit board in a chip-on-film (COF) method to be electrically connected to the sensor layer 200.

The sensor driver 200C may calculate coordinate information about an input based on a signal received from the sensor layer 200 and may provide the main controller 1000C with a coordinate signal I-SS (see FIG. 6) having the coordinate information. The main controller 1000C executes an operation corresponding to a user input based on the coordinate signal I-SS. For example, the main controller 1000C may operate the display driver 100C such that a new application image is displayed on the display layer 100 based on the coordinate signal I-SS.

Figure 5:
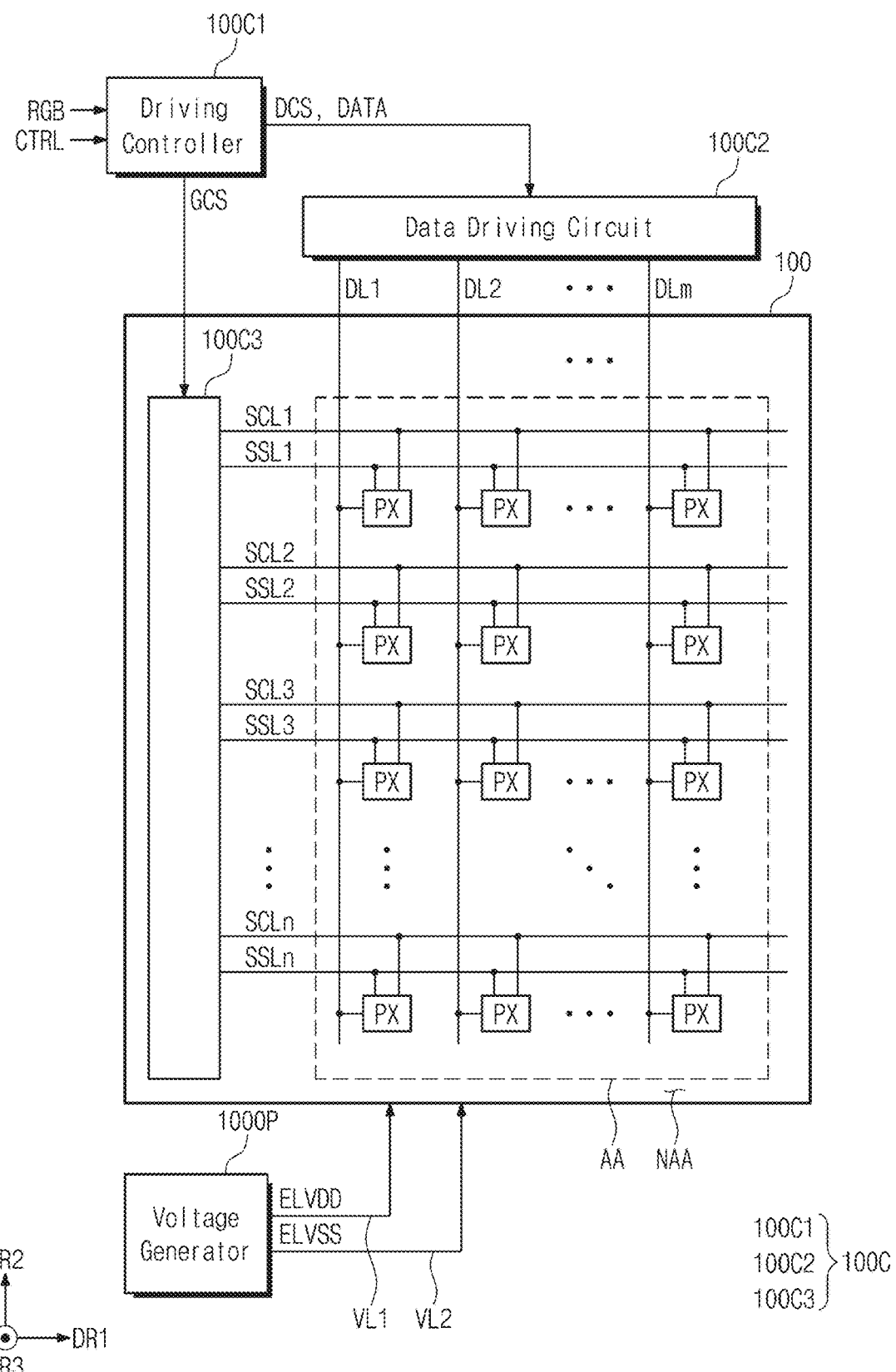
FIG. 5 is a block diagram of a display layer and a display driver, according to one or more embodiments of the present disclosure.

A voltage generator 1000P may include a power management integrated circuit (PMIC). The voltage generator 1000P may generate a plurality of driving voltages for driving the display layer 100, the sensor layer 200, the display driver 100C, and the sensor driver 200C. For example, as shown in FIG. 5, a plurality of driving voltages may include a gate-on voltage and a gate-off voltage, which are required for an operation of a scan-driving circuit 100C3, and a first driving voltage ELVDD and a second driving voltage ELVSS, which are required for an operation of the display layer 100, but is not particularly limited to the example.

Figure 3A:
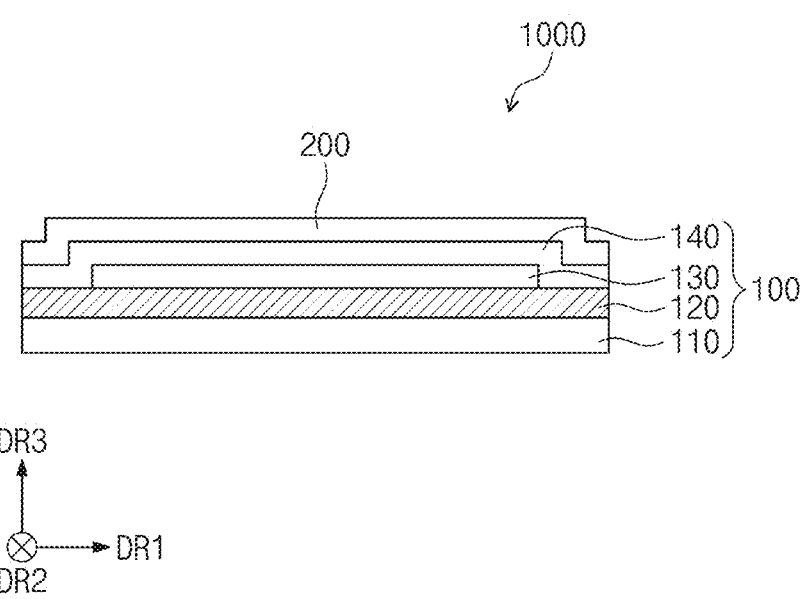
FIG. 3A is a cross-sectional view of an electronic device, according to one or more embodiments of the present disclosure.

FIG. 3A is a cross-sectional view of the electronic device 1000, according to one or more embodiments of the present disclosure.

Referring to FIG. 3A, the electronic device 1000 may include the display layer 100 and the sensor layer 200. The display layer 100 may include a base layer 110, a circuit layer 120, a light-emitting element layer 130, and an encapsulation layer 140.

The base layer 110 may be a member that provides a base surface on which the circuit layer 120 is located. The base layer 110 may be a glass substrate, a metal substrate, or a polymer substrate. However, one or more embodiments is not limited thereto. For example, the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a "base barrier layer".

The circuit layer 120 may be located on the base layer 110. The circuit layer 120 may include an insulating layer, a semiconductor pattern, a conductive pattern, and a signal line. The insulating layer, the semiconductor layer, and the conductive layer may be formed on the base layer 110 in a manner, such as coating, evaporation, or the like. Afterward, the insulating layer, the semiconductor layer, and the conductive layer may be selectively patterned by performing a photolithography process multiple times. Afterward, the semiconductor pattern, the conductive pattern, and the signal line included in the circuit layer 120 may be formed.

The light-emitting element layer 130 may be located on the circuit layer 120. The light-emitting element layer 130 may include a light-emitting element. For example, the light-emitting element layer 130 may include an organic luminescent material, an inorganic luminescent material, an organic-inorganic luminescent material, a quantum dot, a quantum rod, a micro-LED, or a nano-LED.

The encapsulation layer 140 may be located on the light-emitting element layer 130. The encapsulation layer 140 may protect the light-emitting element layer 130 from foreign substances, such as moisture, oxygen, and dust particles.

The sensor layer 200 may be formed on the display layer 100 through a successive process. In this case, the sensor layer 200 may be expressed as being directly located on the display layer 100. As used herein, "directly located" may mean that no third component is interposed between the sensor layer 200 and the display layer 100. That is, a separate adhesive member might not be interposed between the sensor layer 200 and the display layer 100. Alternatively, the sensor layer 200 may be coupled to the display layer 100 through an adhesive member. The adhesive member may include a common adhesive or a common sticking agent.

Figure 3B:
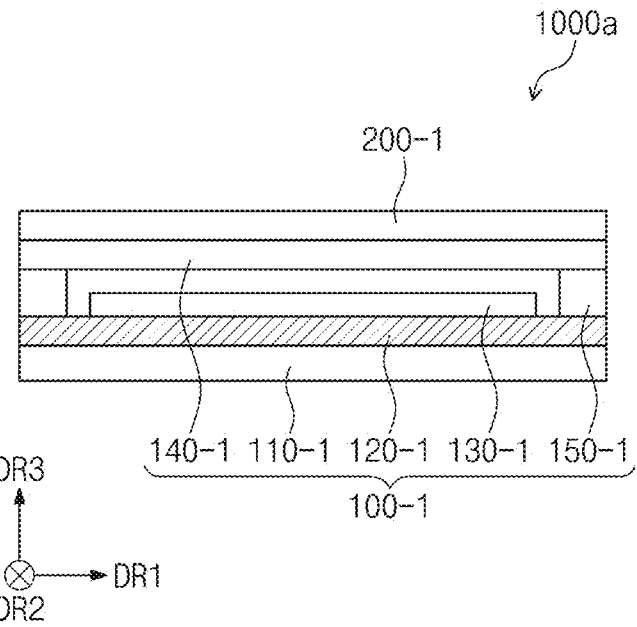
FIG. 3B is a cross-sectional view of an electronic device, according to one or more embodiments of the present disclosure.

FIG. 3B is a cross-sectional view of an electronic device 1000a, according to one or more embodiments of the present disclosure.

Referring to FIG. 3B, the electronic device 1000a may include a display layer 100-1 and a sensor layer 200-1. The display layer 100-1 may include a base substrate 110-1, a circuit layer 120-1, a light-emitting element layer 130-1, an encapsulation substrate 140-1, and a coupling member 150-1.

Each of the base substrate 110-1 and the encapsulation substrate 140-1 may be a glass substrate, a metal substrate, a polymer substrate, or the like, but is not particularly limited thereto.

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable resin or a photo-plastic resin. However, the material constituting the coupling member 150-1 is not limited to the example.

The sensor layer 200-1 may be directly located on the encapsulation substrate 140-1. "Being directly located" may mean that the third component is not interposed between the sensor layer 200-1 and the encapsulation substrate 140-1. That is, a separate adhesive member may not be interposed between the sensor layer 200-1 and the display layer 100-1. However, one or more embodiments is not limited thereto, and an adhesive layer may be further interposed between the sensor layer 200-1 and the encapsulation substrate 140-1.

Figure 4:
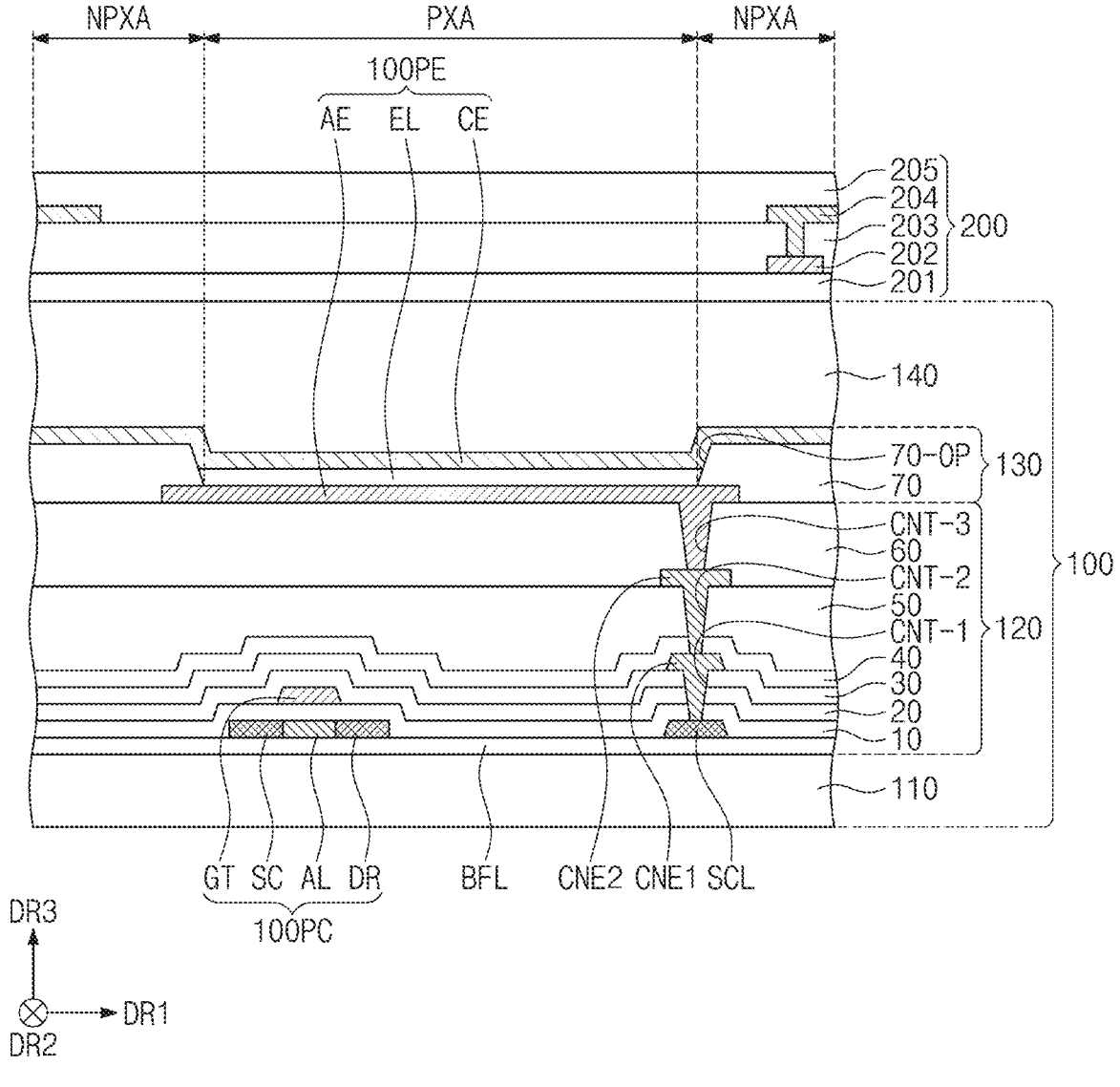
FIG. 4 is a cross-sectional view of an electronic device, according to one or more embodiments of the present disclosure.

FIG. 4 is a cross-sectional view of an electronic device, according to one or more embodiments of the present disclosure. In the description of FIG. 4, the same reference numerals are assigned to the same components described with reference to FIG. 3A, and thus the descriptions thereof are omitted.

Referring to FIG. 4, at least one inorganic layer may be formed on the upper surface of the base layer 110. The inorganic layer may include at least one of aluminum oxide, titanium oxide, silicon oxide, silicon oxynitride, zirconium oxide, or hafnium oxide. The inorganic layer may be formed of multiple layers. The multiple inorganic layers may constitute a barrier layer and/or a buffer layer. In one or more embodiments, the display layer 100 is illustrated as including a buffer layer BFL.

The buffer layer BFL may improve a bonding force between the base layer 110 and a semiconductor pattern. The buffer layer BFL may include a silicon oxide layer and a silicon nitride layer. The silicon oxide layer and the silicon nitride layer may be stacked alternately.

Semiconductor patterns SC, AL, DR, and SCL may be located on the buffer layer BFL. The semiconductor patterns SC, AL, DR, and SCL may include polysilicon. However, one or more embodiments is not limited thereto. For example, the semiconductor patterns SC, AL, DR, and SCL may include amorphous silicon, low-temperature polycrystalline silicon, or an oxide semiconductor.

FIG. 4 only illustrates a part of the semiconductor patterns SC, AL, DR, and SCL, and the semiconductor pattern may be further located in another area. The semiconductor patterns SC, AL, DR, and SCL may be arranged across pixels according to a corresponding rule. The semiconductor patterns SC, AL, DR, and SCL may have a different electrical property depending on whether the semiconductor patterns SC, AL, DR, and SCL are doped. The semiconductor patterns SC, AL, DR, and SCL may include the first areas SC, DR, and SCL having high conductivity, and the second area AL having low conductivity. The first areas SC, DR, and SCL may be doped with an N-type dopant or a P-type dopant. The P-type transistor may include the doped area doped with a P-type dopant, and the N-type transistor may include the doped area doped with an N-type dopant. The second area AL may be an undoped area or may be doped with a concentration lower than a concentration in the first area SC, DR, or SCL.

A conductivity of each of the first areas SC, DR, and SCL is greater than a conductivity of the second area AL. The first areas SC, DR, and SCL may substantially serves as an electrode or a signal line. The second area AL may substantially correspond to an active area (or a channel) of a transistor. In other words, a portion (e.g., the second area AL) of the semiconductor patterns SC, AL, DR, and SCL may be the active area AL of a transistor 100PC, other parts (e.g., the first area SC and DR) may be the source area SC or the drain area DR of the transistor 100PC, and another part (e.g., the first area SCL) may be a connection electrode or the connection signal line SCL.

Each of pixels may include an equivalent circuit including a plurality of transistors, at least one capacitor, and at least one light-emitting element, and the equivalent circuit of a pixel may be modified in various forms. The one transistor 100PC and one light-emitting element 100PE included in a pixel are illustrated in FIG. 4 by way of example.

The source area SC, the active area AL, and the drain area DR of the transistor 100PC may be formed from the semiconductor patterns SC, AL, DR, and SCL. The source area SC and the drain area DR may extend in respective directions opposite to each other from the active area AL in a cross-sectional view. A portion of the connection signal line SCL formed from the semiconductor patterns SC, AL, DR, and SCL is illustrated in FIG. 4. In one or more embodiments, the connection signal line SCL may be connected to the drain area DR of the transistor 100PC in a plan view.

A first insulating layer 10 may be located on the buffer layer BFL. The first insulating layer 10 may overlap a plurality of pixels in common, and may cover the semiconductor patterns SC, AL, DR, and SCL. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, or hafnium oxide. In one or more embodiments, the first insulating layer 10 may be a silicon oxide layer having a single-layer structure. Not only the first insulating layer 10 but also an insulating layer of the circuit layer 120 to be described later may be an inorganic layer and/or an organic layer, and may have a single-layer structure or a multi-layer structure. The inorganic layer may include at least one of the above-described materials, but is not limited thereto.

A gate GT of the transistor 100PC is located on the first insulating layer 10. The gate GT may be a part of a metal pattern. The gate GT overlaps the active area AL. The gate GT may function as a mask in a process of reducing the semiconductor patterns SC, AL, DR, and SCL.

A second insulating layer 20 is located on the first insulating layer 10 and may cover the gate GT. The second insulating layer 20 may overlap pixels in common. The second insulating layer 20 may be an inorganic layer and/or an organic layer, and may have a single-layer structure or a multi-layer structure. The second insulating layer 20 may include at least one of silicon oxide, silicon nitride, or silicon oxynitride. In one or more embodiments, the second insulating layer 20 may have a multi-layer structure including a silicon oxide layer and a silicon nitride layer.

A third insulating layer 30 may be located on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be located on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be located on the third insulating layer 30. The fourth insulating layer 40 may be a single silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be located on the fifth insulating layer 50 and may cover the second connection electrode CNE2. The sixth insulating layer 60 may be an organic layer.

The light-emitting element layer 130 may be located on the circuit layer 120. The light-emitting element layer 130 may include the light-emitting element 100PE. For example, the light-emitting element layer 130 may include an organic luminescent material, an inorganic luminescent material, an organic-inorganic luminescent material, a quantum dot, a quantum rod, a micro-LED, or a nano-LED. Hereinafter, the description will be given under the condition that the light-emitting element 100PE is an organic light-emitting element, but one or more embodiments is not particularly limited thereto.

The light-emitting element 100PE may include a first electrode AE, a light-emitting layer EL, and a second electrode CE. The first electrode AE may be located on the sixth insulating layer 60. The first electrode AE may be connected to the second connection electrode CNE2 through a contact hole CNT-3 penetrating the sixth insulating layer 60.

A pixel-defining film 70 may be located on the sixth insulating layer 60 and may cover a portion of the first electrode AE. An opening 70-OP is defined in the pixel-defining film 70. The opening 70-OP of the pixel-defining film 70 exposes at least part of the first electrode AE.

The display area 1000A (see FIG. 1) may include an emission area PXA and a non-emission area NPXA adjacent to the emission area PXA. The non-emission area NPXA may surround the emission area PXA. In one or more embodiments, the emission area PXA is defined to correspond to a partial area of the first electrode AE, which is exposed by the opening 70-OP.

The light-emitting layer EL may be located on the first electrode AE. The light-emitting layer EL may be located in an area corresponding to the opening 70-OP. FIG. 4 shows an example of the light-emitting layer EL located within the opening 70-OP, but is not particularly limited thereto. For example, the light-emitting layer EL may extend to cover a portion of a side surface of the pixel-defining film 70 and a top surface of the pixel-defining film 70, which define the opening 70-OP.

In one or more embodiments of the present disclosure, the light-emitting layer EL may be separately formed on each of pixels. When the light-emitting layers EL are separately formed in each of pixels, each of the light-emitting layers EL may emit light of at least one of a blue color, a red color, or a green color. However, one or more embodiments is not limited thereto. For example, the light-emitting layer EL may be connected and included in each of the pixels in common. In this case, the light-emitting layer EL may provide blue light or white light.

The second electrode CE may be located on the light-emitting layer EL. The second electrode CE may be included in a plurality of pixels in common while having an integral shape.

In one or more embodiments of the present disclosure, a hole control layer may be interposed between the first electrode AE and the light-emitting layer EL. The hole control layer may be located in common in the emission area PXA and the non-emission area NPXA. The hole control layer may include a hole transport layer and may further include a hole injection layer. An electron control layer may be interposed between the light-emitting layer EL and the second electrode CE. The electron control layer may include an electron transport layer, and may further include an electron injection layer. The hole control layer and the electron control layer may be formed in common in a plurality of pixels by using an open mask or inkjet process.

The encapsulation layer 140 may be located on the light-emitting element layer 130. The encapsulation layer 140 may include an inorganic layer, an organic layer, and an inorganic layer sequentially stacked, and layers constituting the encapsulation layer 140 are not limited thereto. The inorganic layers may protect the light-emitting element layer 130 from moisture and oxygen, and the organic layer may protect the light-emitting element layer 130 from a foreign material, such as dust particles. The inorganic layers may include a silicon nitride layer, a silicon oxynitride layer, a silicon oxide layer, a titanium oxide layer, an aluminum oxide layer, or the like. The organic layer may include, but is not limited to, an acrylic-based organic layer.

The sensor layer 200 may include a base insulating layer 201, a first conductive layer 202, an intermediate insulating layer 203, a second conductive layer 204, and a cover insulating layer 205.

The base insulating layer 201 may be an inorganic layer including at least one of silicon nitride, silicon oxynitride, or silicon oxide. Alternatively, the base insulating layer 201 may be an organic layer including an epoxy resin, an acrylate resin, or an imide-based resin. The base insulating layer 201 may have a single-layer structure or may have a multi-layer structure stacked in the third direction DR3.

Each of the first conductive layer 202 and the second conductive layer 204 may have a single-layer structure or may have a multi-layer structure in which layers are stacked in the third direction DR3.

Each of the first conductive layer 202 and the second conductive layer 204 of a single-layer structure may include a metal layer or a transparent conductive layer. The metal layer may include molybdenum, silver, titanium, copper, aluminum, or an alloy thereof. The transparent conductive layer may include a transparent conductive oxide, such as indium tin oxide (ITO), indium zinc oxide (IZO), zinc oxide (ZnO), indium zinc tin oxide (IZTO), or the like. Besides, the transparent conductive layer may include a conductive polymer, such as poly(3,4-ethylenedioxythiophene) (PE-DOT), a metal nano wire, graphene, and the like.

Each of the first conductive layer 202 and the second conductive layer 204 of the multi-layer structure may include metal layers. For example, the metal layers may have a three-layer structure of titanium/aluminum/titanium. The conductive layer of the multi-layer structure may include at least one metal layer and at least one transparent conductive layer.

In one or more embodiments of the present disclosure, the thickness of the first conductive layer 202 may be greater than or equal to the thickness of the second conductive layer 204. If the thickness of the first conductive layer 202 is greater than the thickness of the second conductive layer 204, the resistance of a component (e.g., an electrode, a sensing pattern, or a bridge pattern) included in the first conductive layer 202 may be reduced. Moreover, because the first conductive layer 202 is located under the second conductive layer 204, the probability that components included in the first conductive layer 202 are to be recognized by external light reflection may be lower than that of the second conductive layer 204, even though the thickness of the first conductive layer 202 is increased.

At least one of the intermediate insulating layer 203 and the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the intermediate insulating layer 203 and the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, or perylene-based resin.

Previously, the description is given under the condition that the sensor layer 200 includes a total of two conductive layers (e.g., the first conductive layer 202 and the second conductive layer 204), but one or more embodiments is not particularly limited thereto. For example, the sensor layer 200 may include three or more conductive layers.

FIG. 5 is a block diagram of the display layer 100 and the display driver 100C, according to one or more embodiments of the present disclosure.

Referring to FIG. 5, the display driver 100C includes a driving controller 100C1, a data-driving circuit 100C2, and the scan-driving circuit 100C3.

The display layer 100 includes driving scan lines SCL1, SCL2, SCL3, . . . , SCLn, sensing scan lines SSL1, SSL2, SSL3, . . . , SSLn, data lines DL1, DL2, . . . , DLm, and pixels PX. Here, each of 'n' and 'm' is integers greater than or equal to 1. The display layer 100 may be divided into an active area AA and an inactive area NAA. The pixels PX may be placed in the active area AA of the display layer 100. The scan-driving circuit 100C3 may be placed in the inactive area NAA of the display layer 100.

The driving scan lines SCL1, SCL2, SCL3, . . . , SCLn and the sensing scan lines SSL1, SSL2, SSL3, . . . , SSLn extend in parallel with the first direction DR1 and are arranged spaced from each other in the second direction DR2. The second direction DR2 may be a direction crossing the first direction DR1. The data lines DL1, DL2, . . . , DLm extend to be parallel to the second direction DR2 and are arranged spaced from each other in the first direction DR1.

The plurality of pixels PX are electrically connected to the driving scan lines SCL1, SCL2, SCL3, . . . , SCLn, the sensing scan lines SSL1, SSL2, SSL3, . . . , SSLn, and the data lines DL1, DL2, . . . , DLm. Each of the plurality of pixels PX may be electrically connected with two scan lines. However, the number of scan lines connected to each of the pixels PX is not limited thereto. For example, each pixel may be electrically connected to one or three scan lines. The display layer 100 may further include read-out lines (or referred to as "sensing lines"), which extend in the second direction DR2 and which are arranged in the first direction DR1. In this case, the plurality of pixels PX may be connected to the read-out lines.

Each of the plurality of pixels PX includes a light-emitting element and a pixel circuit unit for controlling the emission of the light-emitting element. The light-emitting element may include an organic light-emitting diode, an inorganic light-emitting diode, a micro-LED, or a nano-LED. The pixel circuit unit may include a plurality of transistors and at least one capacitor.

The driving controller 100C1 receives the input image signal RGB and the control signal CTRL from the main controller 1000C (see FIG. 3). The driving controller 100C1 may generate image data DATA by converting the input image signal RGB.

The driving controller 100C1 generates the scan control signal GCS and the data control signal DCS based on the control signal CTRL. The data-driving circuit 100C2 receives the data control signal DCS and the image data DATA from the driving controller 100C1. The data-driving circuit 100C2 converts the image data DATA into data voltages (or referred to as "data signals") in response to the data control signal DCS. The data-driving circuit 100C2 outputs the data voltages to the plurality of data lines DL1, DL2, . . . , DLm. The data voltages may be analog voltages corresponding to grayscale values of the image data DATA.

As an example of the present disclosure, the data-driving circuit 100C2 may be formed in a form of at least one chip (or an integrated circuit). The data-driving circuit 100C2 may be placed in the inactive area NAA of the display layer 100, but is not limited thereto. For example, the data-driving circuit 100C2 may be mounted on a circuit film connected to the display layer 100.

The scan-driving circuit 100C3 receives the scan control signal GCS from the driving controller 100C1. The scan-driving circuit 100C3 may output scan signals in response to the scan control signal GCS. The scan-driving circuit 100C3 may be built into the display layer 100. If the scan-driving circuit 100C3 is built into the display layer 100, the scan-driving circuit 100C3 may include transistors formed through the same process as the pixel circuit unit of each of the pixels PX. The scan-driving circuit 100C3 may be placed in the inactive area NAA of the display layer 100. However, the present disclosure is not limited thereto. In one or more embodiments, at least part of the scan-driving circuit 100C3 may overlap the active area AA of the display layer 100.

The scan-driving circuit 100C3 may generate a plurality of driving scan signals and a plurality of sensing scan signals in response to the scan control signal GCS. The plurality of driving scan signals are applied to the driving scan lines SCL1, SCL2, SCL3, . . . , SCLn. The plurality of sensing scan signals are applied to the sensing scan lines SSL1, SSL2, SSL3, . . . , SSLn.

Each of the plurality of pixels PX may receive the first driving voltage ELVDD and the second driving voltage ELVSS.

The voltage generator 1000P generates voltages suitable for the operation of the display layer 100. In one or more embodiments of the present disclosure, the voltage generator 1000P generates the first driving voltage ELVDD and the second driving voltage ELVSS, which are suitable for the operation of the display layer 100. The first driving voltage ELVDD and the second driving voltage ELVSS may be provided to the display layer 100 through a first driving voltage line VL1 and a second driving voltage line VL2, respectively.

As well as the first driving voltage ELVDD and the second driving voltage ELVSS, the voltage generator 1000P may further generate various voltages (e.g., a gamma reference voltage, a data-driving voltage, a gate-on voltage, and a gate-off voltage) suitable for operations of the data-driving circuit 100C2 and the scan-driving circuit 100C3.

Figure 6:
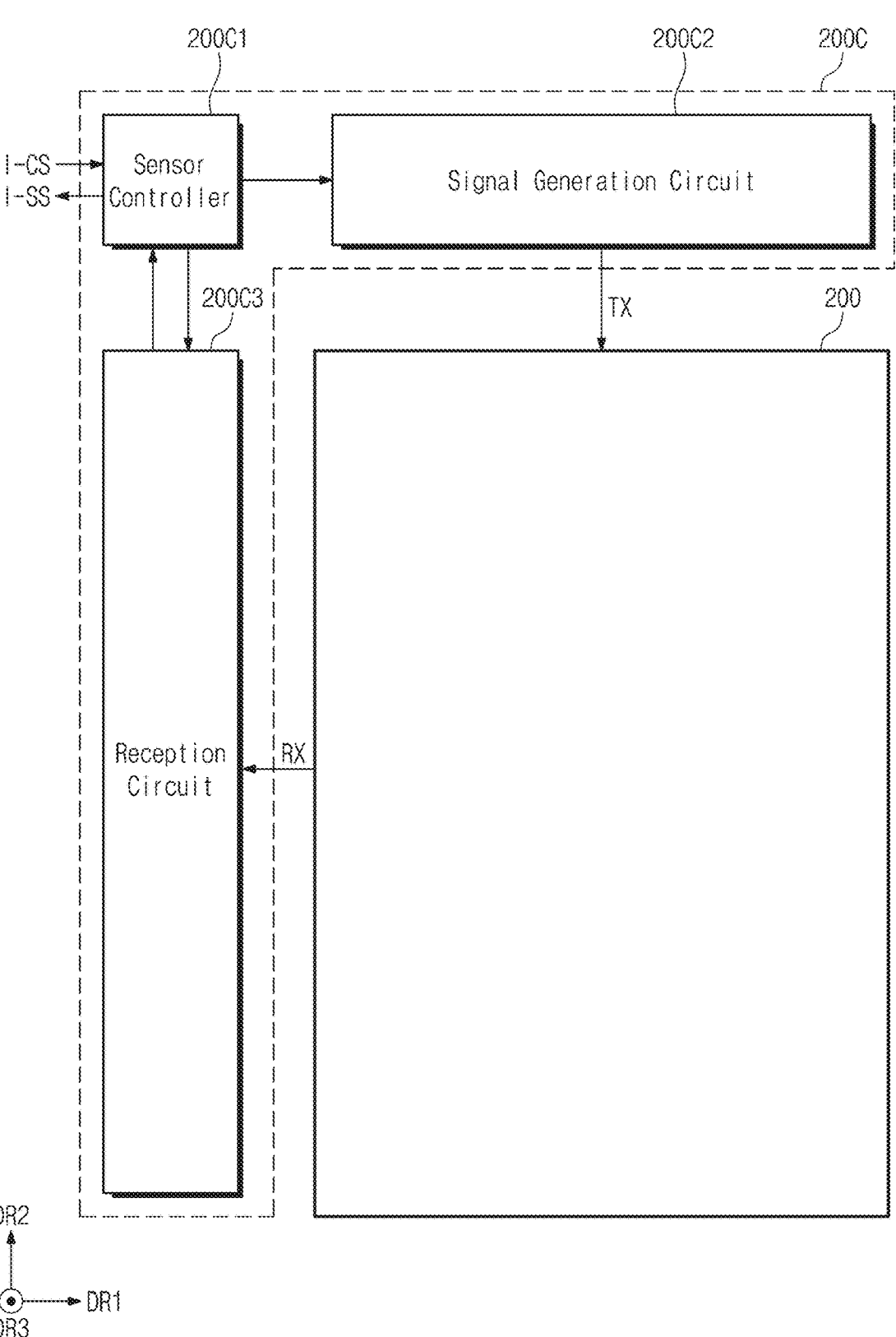
FIG. 6 is a block diagram of a sensor layer and a sensor driver, according to one or more embodiments of the present disclosure.
Figure 7:
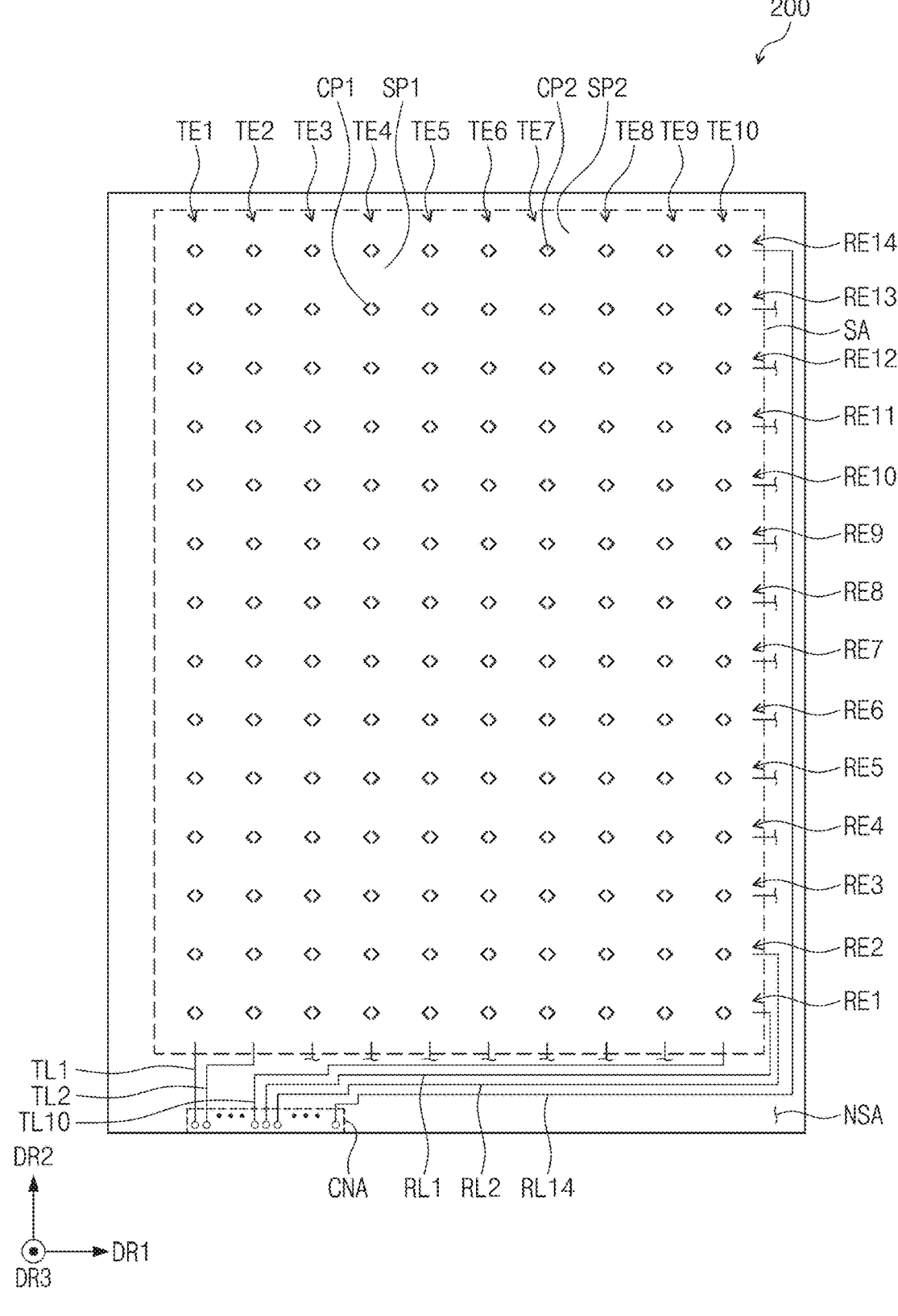
FIG. 7 is a diagram showing a sensor layer, according to one or more embodiments of the present disclosure.

FIG. 6 is a block diagram of the sensor layer 200 and the sensor driver 200C, according to one or more embodiments of the present disclosure. FIG. 7 is a diagram showing the sensor layer 200, according to one or more embodiments of the present disclosure.

Referring to FIGS. 6 and 7, an input sensor (e.g., an input-sensing device) includes the sensor layer 200 and the sensor driver 200C. A sensing area SA and an inactive sensing area NSA may be defined in the sensor layer 200. The sensing area SA may be an area activated depending on an electrical signal. For example, the sensing area SA may be an area for detecting an input. The sensing area SA may overlap the active area AA (see FIG. 5) of the display layer 100 (see FIG. 5). The inactive sensing area NSA may surround the sensing area SA. The inactive sensing area NSA may be an area where an input is not detected. The inactive sensing area NSA may overlap the inactive area NAA (see FIG. 5) of the display layer 100 (see FIG. 5).

The sensor layer 200 may include first electrodes TE1 to TE10 (or referred to as "transmission electrodes") and second electrodes RE1 to RE14 (or referred to as "reception electrodes"). Each of the first electrodes TE1 to TE10 may extend in the second direction DR2, and the first electrodes TE1 to TE10 may be arranged spaced from each other in the first direction DR1. Each of the second electrodes RE1 to RE14 may extend in the first direction DR1, and the second electrodes RE1 to RE14 may be arranged spaced from each other in the second direction DR2.

FIG. 7 illustrates that the sensor layer 200 includes the ten first electrodes TE1 to TE10 and the fourteen second electrodes RE1 to RE14, but the present disclosure is not limited thereto. The number of first electrodes TE1 to TE10 and the number of second electrodes RE1 to RE14 may be variously changed.

The sensor layer 200 may further include a plurality of first signal wires (or first trace wires) TL1 to TL10 connected to the first electrodes TE1 to TE10 and second signal wires (or second trace wires) RL1 to RL14 connected to the plurality of reception electrodes RE1 to RE14.

A first end of each of the first signal wires TL1 to TL10 and a first end of each of the second signal wires RL1 to RL14 may be electrically connected to the sensor driver 200C in a connection area CNA.

Each of the first electrodes TE1 to TE10 may include a first sensing portion SP1 and a bridge portion CP1. The two first sensing portions SP1 adjacent to each other may be electrically connected to each other by the bridge portion CP1, but are not particularly limited thereto. The first sensing portion SP1 and the bridge portion CP1 may be placed on different layers from each other.

Each of the second electrodes RE1 to RE14 may include a second sensing portion SP2 and a connection portion CP2. The second sensing portion SP2 and the connection portion CP2 may be integrated with each other, and may be located on or at the same layer as each other. Each of the first electrodes TE1 to TE10 may have a mesh shape, and each of the second electrodes RE1 to RE14 may have a mesh shape.

The first and second sensing portions SP1 and SP2, the bridge portion CP1, and the connection portion CP2 may include a metal layer. The first and second sensing portions SP1 and SP2, the bridge portion CP1, and the connection portion CP2 may have mesh shapes, respectively.

The sensor driver 200C may receive the control signal I-CS from the main controller 1000C (see FIG. 2), and may provide the coordinate signal I-SS to the main controller 1000C (see FIG. 2).

The sensor driver 200C may include a sensor controller 200C1, a signal generation circuit 200C2, and a reception circuit 200C3. The sensor controller 200C1, the signal generation circuit 200C2, and the reception circuit 200C3 may be implemented in a single chip. Alternatively, a part of the sensor controller 200C1, the signal generation circuit

200C2, and the reception circuit 200C3, and another part thereof may be implemented in different chips from each other.

The sensor controller 200C1 may control operations of the signal generation circuit 200C2, and may calculate coordinates of an external input from a sensing signal received from the reception circuit 200C3 or may analyze information transmitted by an input device 2000 (see FIG. 2) from the modulated signal received from the reception circuit 200C3.

The signal generation circuit 200C2 may output transmission signals TX to the sensor layer 200, for example, the first electrodes TE1 to TE10. The signal generation circuit 200C2 may output the transmission signals TX, which is matched with an operating mode, to the sensor layer 200. In one or more embodiments, the signal generation circuit 200C2 may change the frequency of the transmission signals TX. In one or more embodiments, the signal generation circuit 200C2 may divide the transmission signals TX into a plurality of groups, and may change the frequency of the transmission signals TX differently for respective groups.

The reception circuit 200C3 may receive the sensing signals RX from the sensor layer 200, for example, the reception electrodes RE1 to RE14. The reception circuit 200C3 may convert an analog signal into a digital signal. For example, the reception circuit 200C3 may amplify the received sensing signals RX having an analog format, may filter the amplified signals, and may convert the filtered signal into the digital signal.

The sensor controller 200C1 may generate the coordinate signal I-SS based on the digital signal received from the reception circuit 200C3. For example, the sensor controller 200C1 may generate the coordinate signal I-SS by using the digital signal.

The sensor controller 200C1 may determine external noise based on the digital signal received from the reception circuit 200C3. In one or more embodiments, when it is determined that external noise in a corresponding area is large, the sensor controller 200C1 may control the signal generation circuit 200C2 such that the frequency of the transmission signals TX is changed.

FIGS. 8A, 8B, 80, 8D, 8E, and 8F are diagrams showing sensing signals according to frequencies of the transmission signals TX.

Figure 8A:
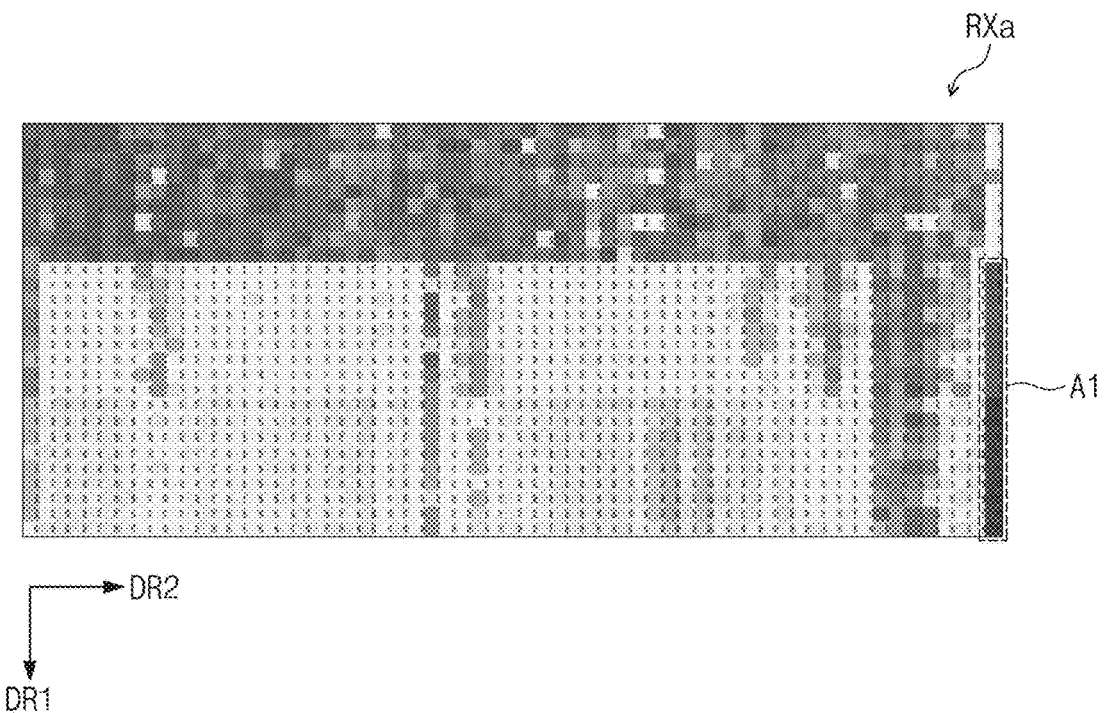

FIG. 8A shows sensing signals RXa when a frequency of the transmission signals TX is a first frequency. In one or more embodiments, the first frequency is about 74 KHz.

Figure 8B:
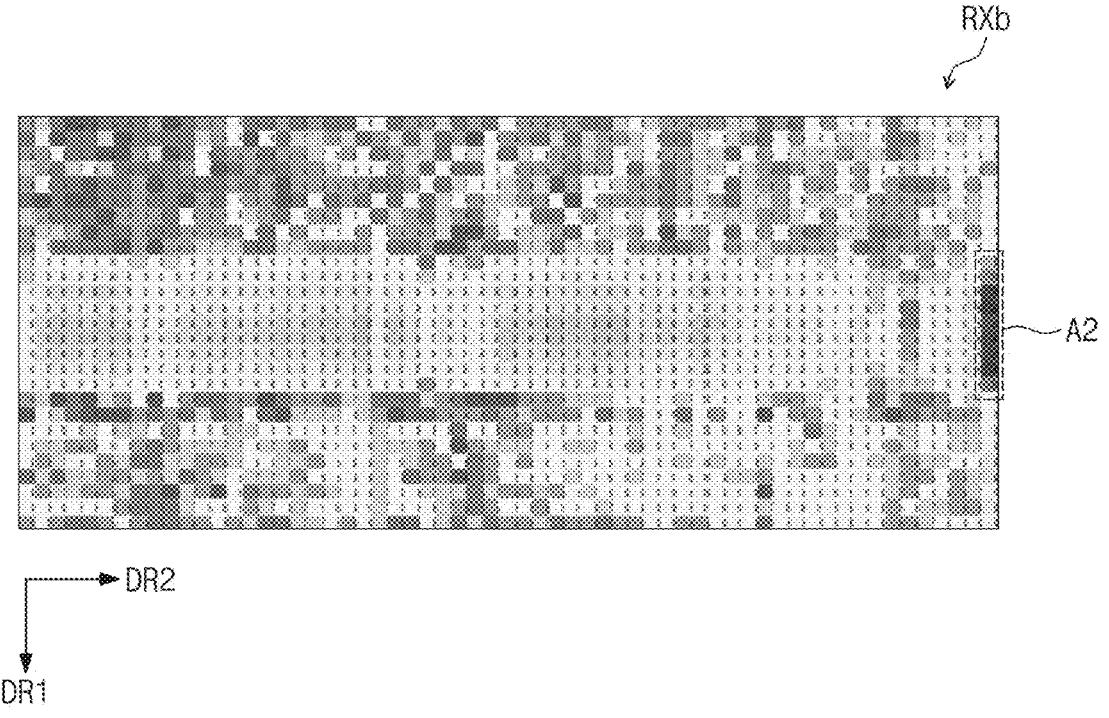

FIG. 8B shows sensing signals RXb when the frequency of the transmission signals TX is a second frequency. In one or more embodiments, the second frequency is about 76 KHz.

Figure 8C:
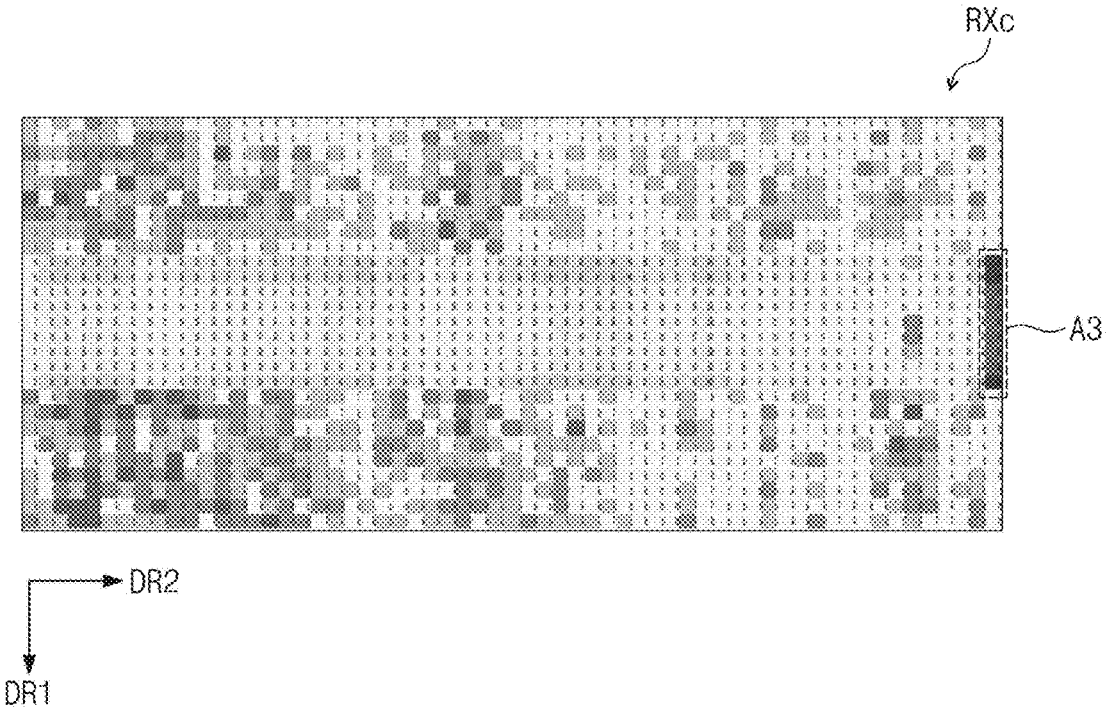

FIG. 8C shows sensing signals RXc when the frequency of the transmission signals TX is a third frequency. In one or more embodiments, the third frequency is about 78 KHz.

Figure 8D:
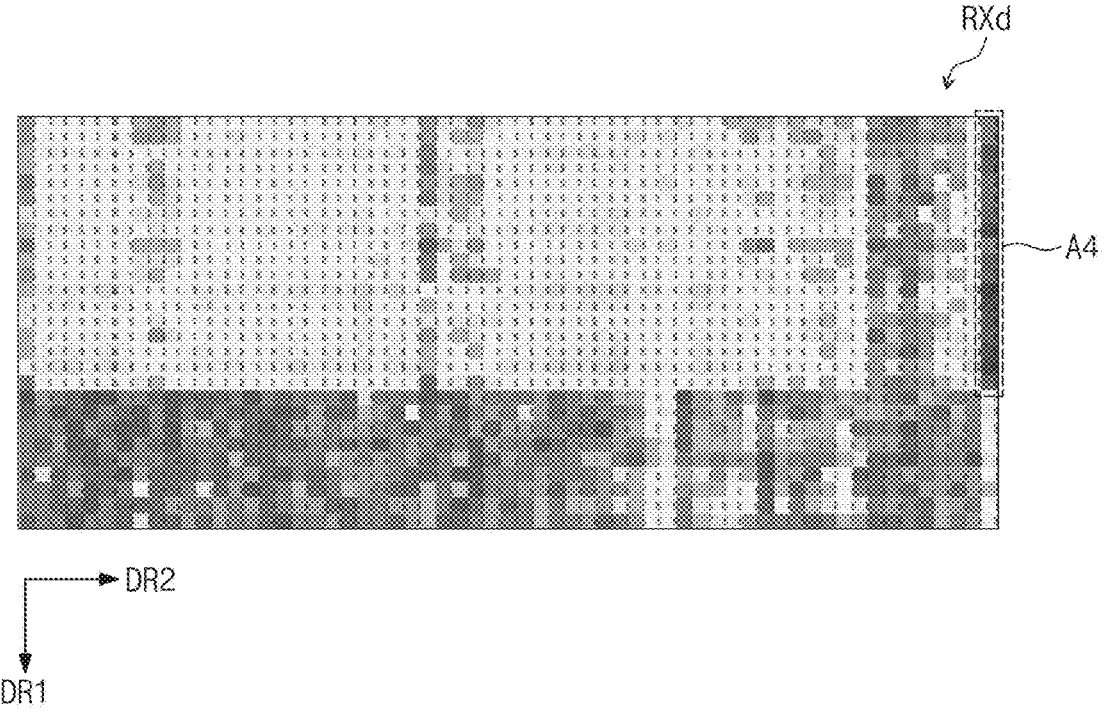

FIG. 8D shows sensing signals RXd when the frequency of the transmission signals TX is a fourth frequency. In one or more embodiments, the fourth frequency is about 80 KHz.

Figure 8E:
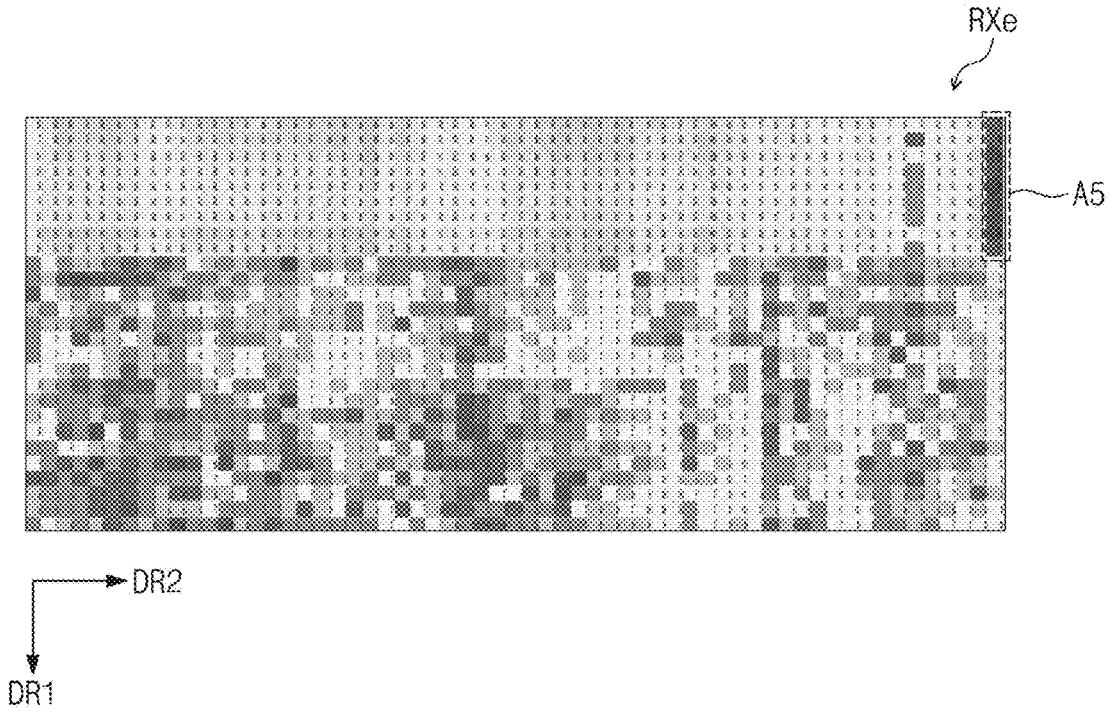

FIG. 8E shows sensing signals RXe when the frequency of the transmission signals TX is a fifth frequency. In one or more embodiments, the fifth frequency is about 82 KHz.

Figure 8F:
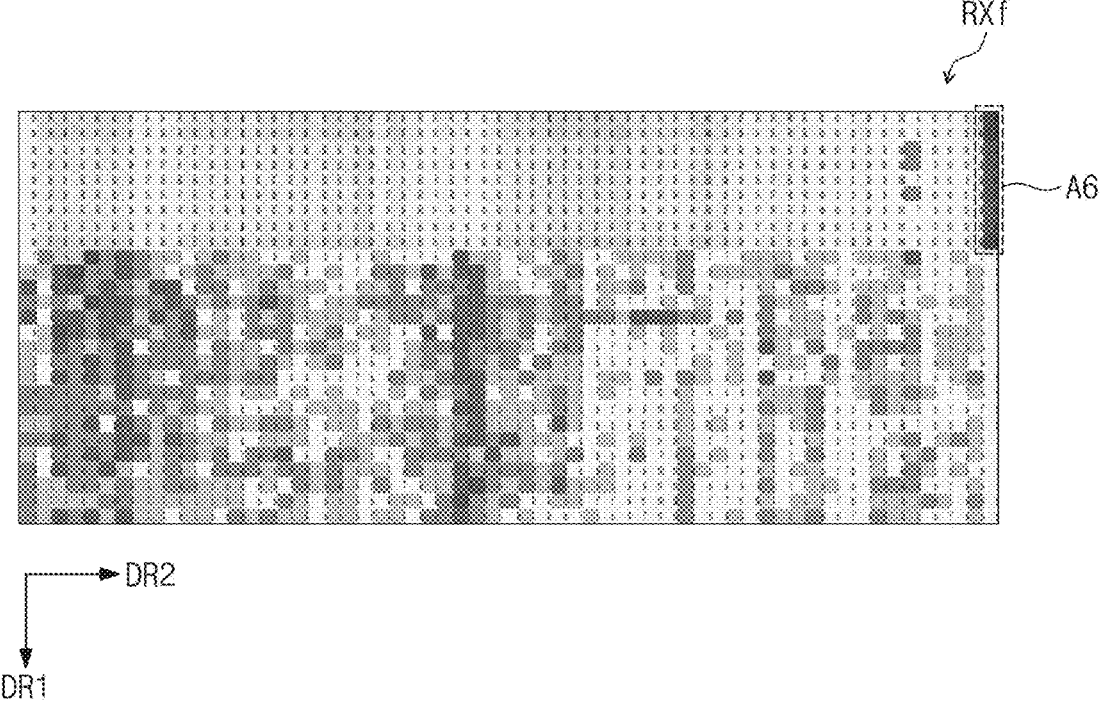

FIG. 8F shows sensing signals RXf when the frequency of the transmission signals TX is a sixth frequency. In one or more embodiments, the sixth frequency is about 84 kHz.

As illustrated in FIGS. 8A to 8F, it may be seen that the sensing signals RXa, RXb, RXc, RXd, RXe, and RXf vary depending on the frequency of the transmission signals TX.

For example, it may be seen that levels of sensing signals RXa, RXb, RXc, RXd, RXe, and RXf in corresponding areas A1, A2, A3, A4, A5, and A6 are different from those in other areas depending on the frequency of the transmission signals TX.

The areas A1, A2, A3, A4, A5, and A6 are areas located far from the connection area CNA in the second direction DR2 in which a first end of each of the first signal wires TL1 to TL10 and a first end of each of the second signal wires RL1 to RL14 are located.

In other words, when the transmission signals TX delivered through the first signal wires TL1 to TL10 are distorted due to wire resistance, levels of the sensing signals RXa, RXb, RXc, RXd, RXe, and RXf of the respective areas A1, A2, A3, A4, A5, and A6 may be different from those of other areas.

Figure 9:
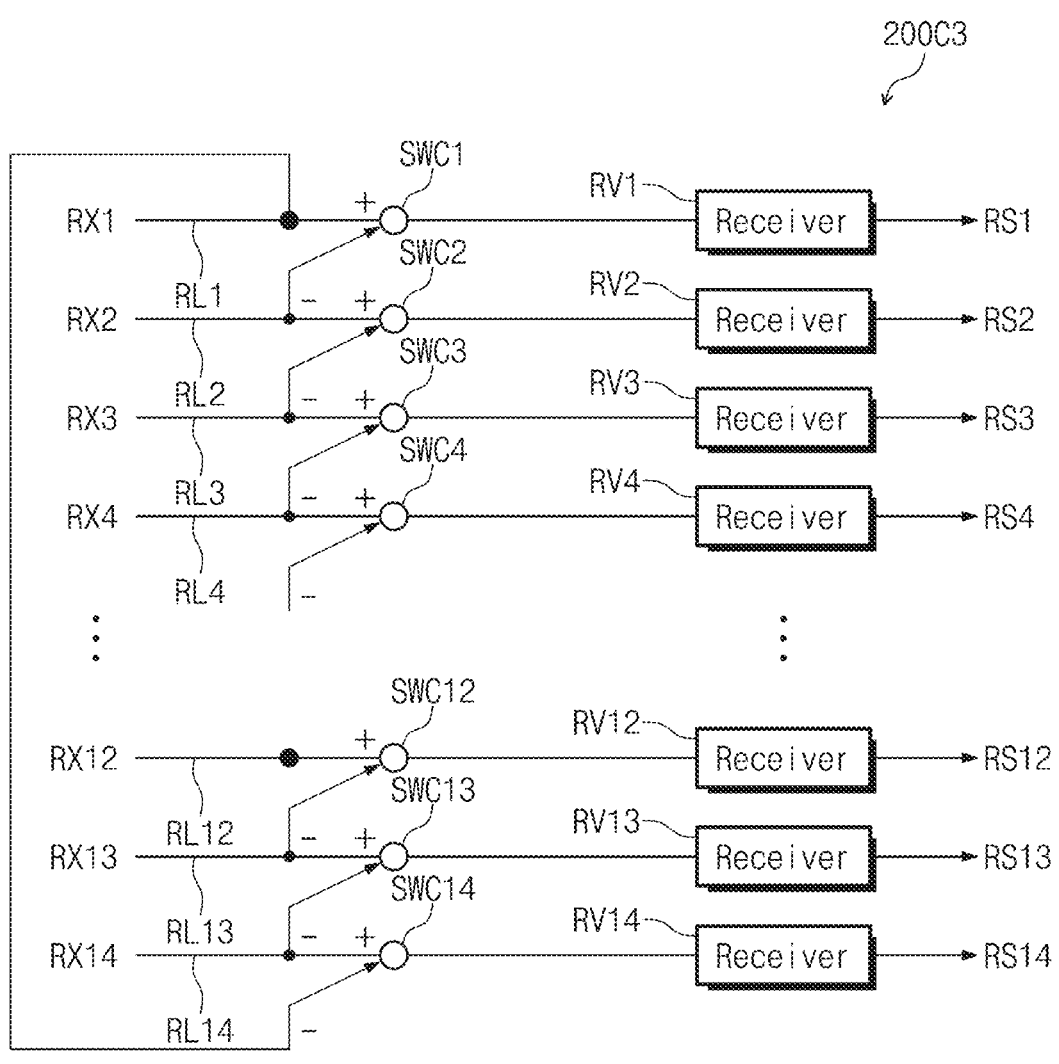
FIG. 9 is a block diagram of a reception circuit, according to one or more embodiments of the present disclosure.

FIG. 9 is a block diagram of the reception circuit 200C3, according to one or more embodiments of the present disclosure.

Referring to FIGS. 7 and 9, the reception circuit 200C3 receives sensing signals RX1 to RX14 from the second signal wires RL1 to RL14 and outputs reception signals RS1 to RS14. The sensing signal RX may include the sensing signals RX1 to RX14.

In one or more embodiments, the sensing signals RX1 to RX14 are analog signals, and the reception signals RS1 to RS14 are digital signals.

The reception circuit 200C3 includes switching circuits SWC1 to SWC14 and receivers RV1 to RV14. In the example illustrated in FIG. 7, because the number of the second signal wires RL1 to RL14 is 14, FIG. 9 illustrates that the number of switching circuits SWC1 to SWC14 is 14, and the number of receivers RV1 to RV14 is 14. Accordingly, the present disclosure is not limited thereto. The number of switching circuits SWC1 to SWC14 included in the reception circuit 200C3 and the number of receivers RV1 to RV14 included in the reception circuit 200C3 may be variously changed.

Each of the switching circuits SWC1 to SWC14 delivers sensing signals received from two second corresponding signal wires among the second signal wires RL1 to RL14 to a corresponding receiver among the receivers RV1 to RV14.

For example, the switching circuit SWC1 delivers the sensing signals RX1 and RX2 received from the second signal wires RL1 and RL2, which are adjacent to each other, to the receiver RV1. The switching circuit SWC2 delivers the sensing signals RX2 and RX3 received from the second signal wires RL2 and RL3, which are adjacent to each other, to the receiver RV2. The switching circuit SWC13 delivers the sensing signals RX13 and RX14 received from the second signal wires RL13 and RL14, which are adjacent to each other, to the receiver RV13. The switching circuit SWC14 delivers the sensing signals RX14 and RX1 received from the second signal wires RL14 and RL1 to the receiver RV14.

Each of the receivers RV1 to RV14 outputs a reception signal based on sensing signals received through the corresponding receiver among the switching circuits SWC1 to SWC14.

For example, the receiver RV1 receives the sensing signals RX1 and RX2 through the switching circuit SWC1 and outputs the reception signal RS1 (e.g., a "first reception signal" in the claims). The receiver RV2 receives the sensing signals RX2 and RX3 through the switching circuit SWC2 and outputs the reception signal RS2. The receiver RV13 receives the sensing signals RX13 and RX14 through the switching circuit SWC13 and outputs the reception signal RS13. The receiver RV14 receives the sensing signals RX14 and RX1 through the switching circuit SWC14 and outputs the reception signal RS14 (e.g., a "second reception signal" in the claims).

In one or more embodiments, each of the switching circuits SWC1 to SWC14 may operate as a switching element that sequentially delivers sensing signals received from two second signal wires to a corresponding receiver among the receivers RV1 to RV14.

If each of the switching circuits SWC1 to SWC14 operates as a switching element, the receivers RV1 to RV14 may output the reception signals RS1 to RS14 corresponding to differences between received sensing signals.

In one or more embodiments, each of the switching circuits SWC1 to SWC14 may operate as a differential amplifier that delivers a signal corresponding to a difference between sensing signals received from two second signal wires to a corresponding receiver among the receivers RV1 to RV14.

If each of the switching circuits SWC1 to SWC14 operates as a differential amplifier, the receivers RV1 to RV14 may output the reception signals RS1 to RS14 corresponding to differences between sensing signals.

Figure 10:
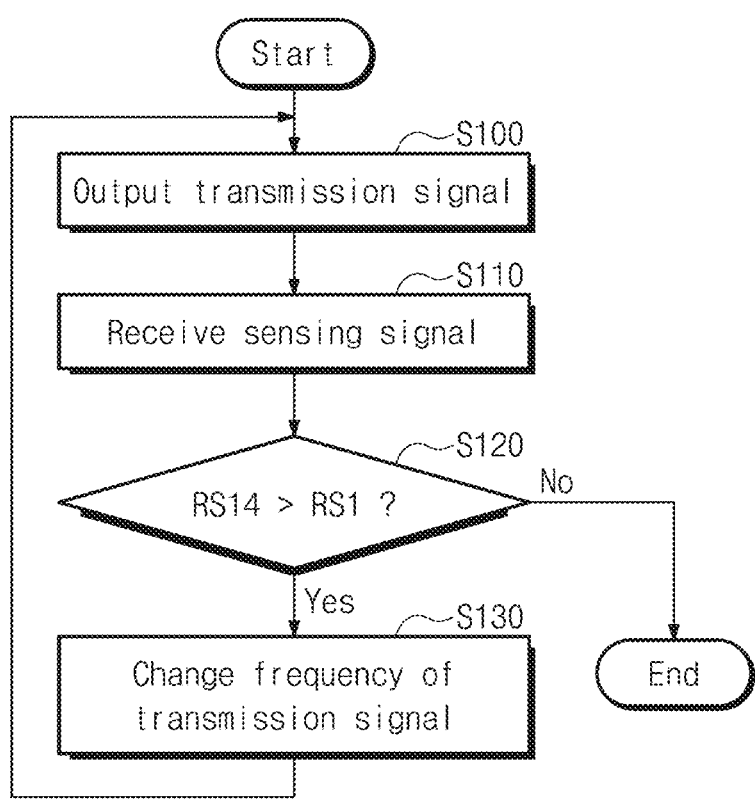
FIG. 10 is a flowchart for describing a noise test operation of a sensor driver, according to one or more embodiments of the present disclosure.

FIG. 10 is a flowchart for describing a noise test operation of the sensor driver 200C, according to one or more embodiments of the present disclosure.

Referring to FIGS. 6, 7, 9, and 10, the sensor driver 200C outputs the transmission signals TX to the first electrodes TE1 to TE10 through the first signal wires TL1 to TL10 (operation S100).

The sensor driver 200C receives the sensing signals RX from the second electrodes RE1 to RE14 through the second signal wires RL1 to RL14 (operation S110).

The sensor driver 200C outputs the reception signals RS1 to RS14 based on the sensing signals RX. The sensor driver 200C may determine the noise included in the sensing signals RX based on the reception signals RS1 to RS14.

As described in FIGS. 7 and 8A to 8F, sensing signals received from areas A1, A2, A3, A4, A5, and A6 located far from the connection area CNA may be different from sensing signals received from other areas.

The receiver RV14 outputs the reception signal RS14 corresponding to a difference between the sensing signals RX14 and RX1. If noise levels of the areas A1, A2, A3, A4, A5, and A6 located far from the connection area CNA is relatively high, the reception signal RS14 output from the receiver RV14 may have a greater value than the reception signal RS1 output from the receiver RV1.

The sensor driver 200C determines whether the reception signal RS14 is greater than the reception signal RS1 (operation S120). In one or more embodiments, the reception signal RS1 is a reference reception signal.

If the reception signal RS14 is greater than the reception signal RS1, the sensor driver 200C determines that noise levels of the areas A1, A2, A3, A4, A5, and A6 far from the connection area CNA are high.

If the reception signal RS14 is greater than the reception signal RS1, the sensor driver 200C may change the frequency of the transmission signal TX (operation S130). The control operation of the sensor driver 200C may return to operation S100.

If the reception signal RS14 is not greater than the reception signal RS1, the noise test operation of the sensor driver 200C may be terminated.

FIG. 10 illustrates that the sensor driver 200C compares the reception signal RS14 with the reference reception signal RS1, but the present disclosure is not limited thereto. The reference reception signal may be any one of the reception signals RS1 to RS13.

In one or more embodiments, the receiver RV14 is a receiver under test, and the receiver RV1 is a reference receiver. The reference receiver may be any one of the receivers RV1 to RV13.

Figure 11:
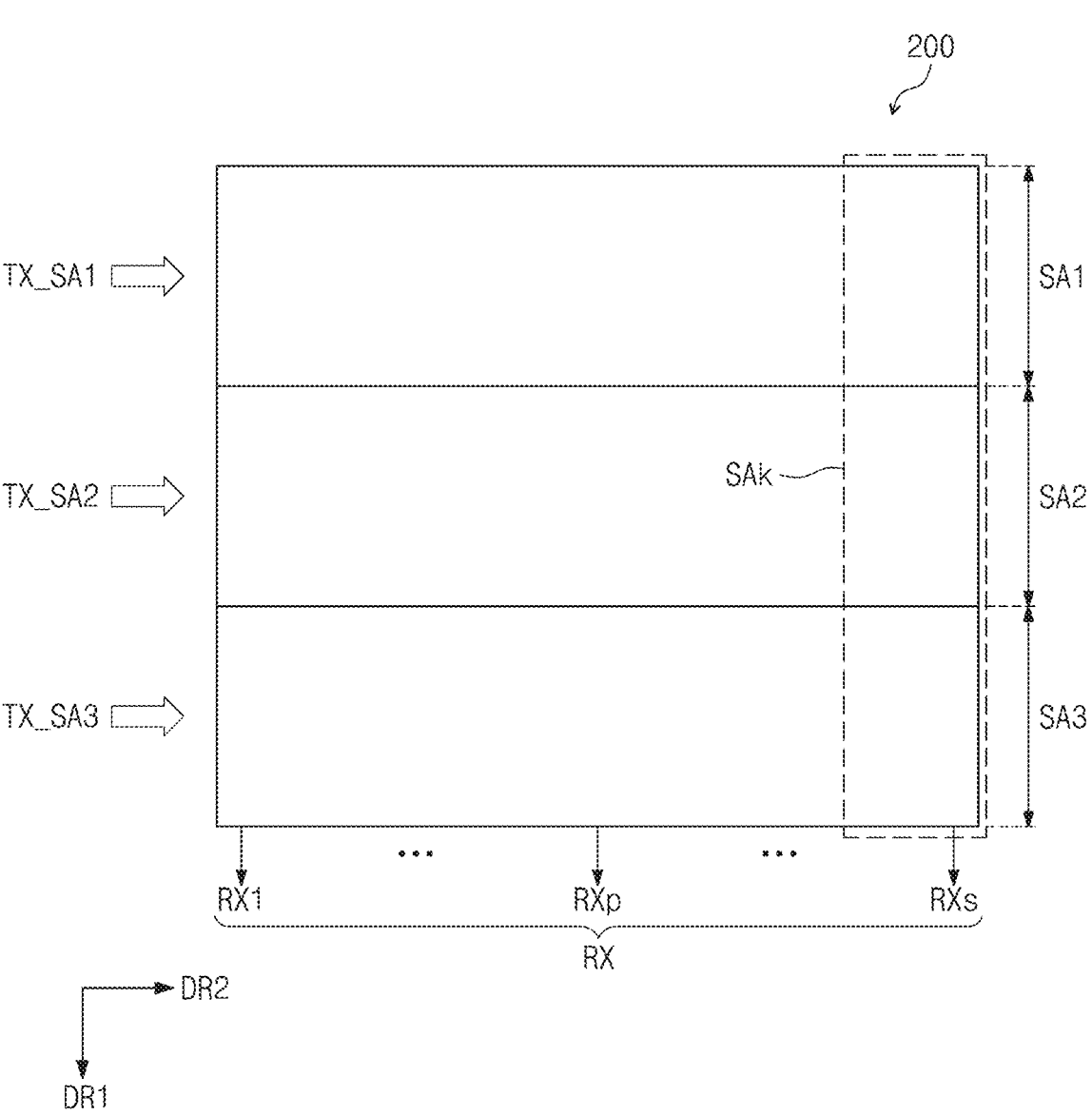
FIG. 11 is a diagram showing a sensor layer, according to one or more embodiments of the present disclosure.

FIG. 11 is a diagram showing the sensor layer 200, according to one or more embodiments of the present disclosure.

In FIG. 11, the sensor layer 200 may be divided into a first sensing area SA1, a second sensing area SA2, and a third sensing area SA3. The first sensing area SA1, the second sensing area SA2, and the third sensing area SA3 may be sequentially placed in the first direction DR1. Although FIG. 11 illustrates that the sensor layer 200 is divided into three sensing areas, the present disclosure is not limited thereto. The sensor layer 200 may be divided into two or more sensing areas.

The sensor driver 200C may provide first transmission signals TX_SA1 to the first sensing area SA1, may provide second transmission signals TX_SA2 to the second sensing area SA2, and may provide third transmission signals TX_SA3 to the third sensing area SA3. The sensor driver 200C may determine the frequency of the first transmission signals TX_SA1, the frequency of the second transmission signals TX_SA2, and the frequency of the third transmission signals TX_SA3.

In one or more embodiments, the frequency of the first transmission signals TX_SA1, the frequency of the second transmission signals TX_SA2, and the frequency of the third transmission signals TX_SA3 may be the same as each other. In one or more embodiments, at least one of the first transmission signals TX_SA1, the second transmission signals TX_SA2, or the third transmission signals TX_SA3 may have a different frequency from the frequency of other transmission signals. For example, the first transmission signals TX_SA1 and the second transmission signals TX_SA2 may have a first transmission frequency. The third transmission signals TX_SA3 may have a second transmission frequency that is different from the first transmission frequency. For example, the first transmission signals TX_SA1 may have the first transmission frequency, the second transmission signals TX_SA2 may have the second transmission frequency, and the third transmission signals TX_SA3 may have a third transmission frequency. Here, the first to third transmission frequencies are different frequencies from each other.

The sensing signals RX (e.g., the sensing signals RX1, . . . , RXp, . . . , RXs) output from the sensor layer 200 may be provided to the sensor driver 200C.

Figure 12:
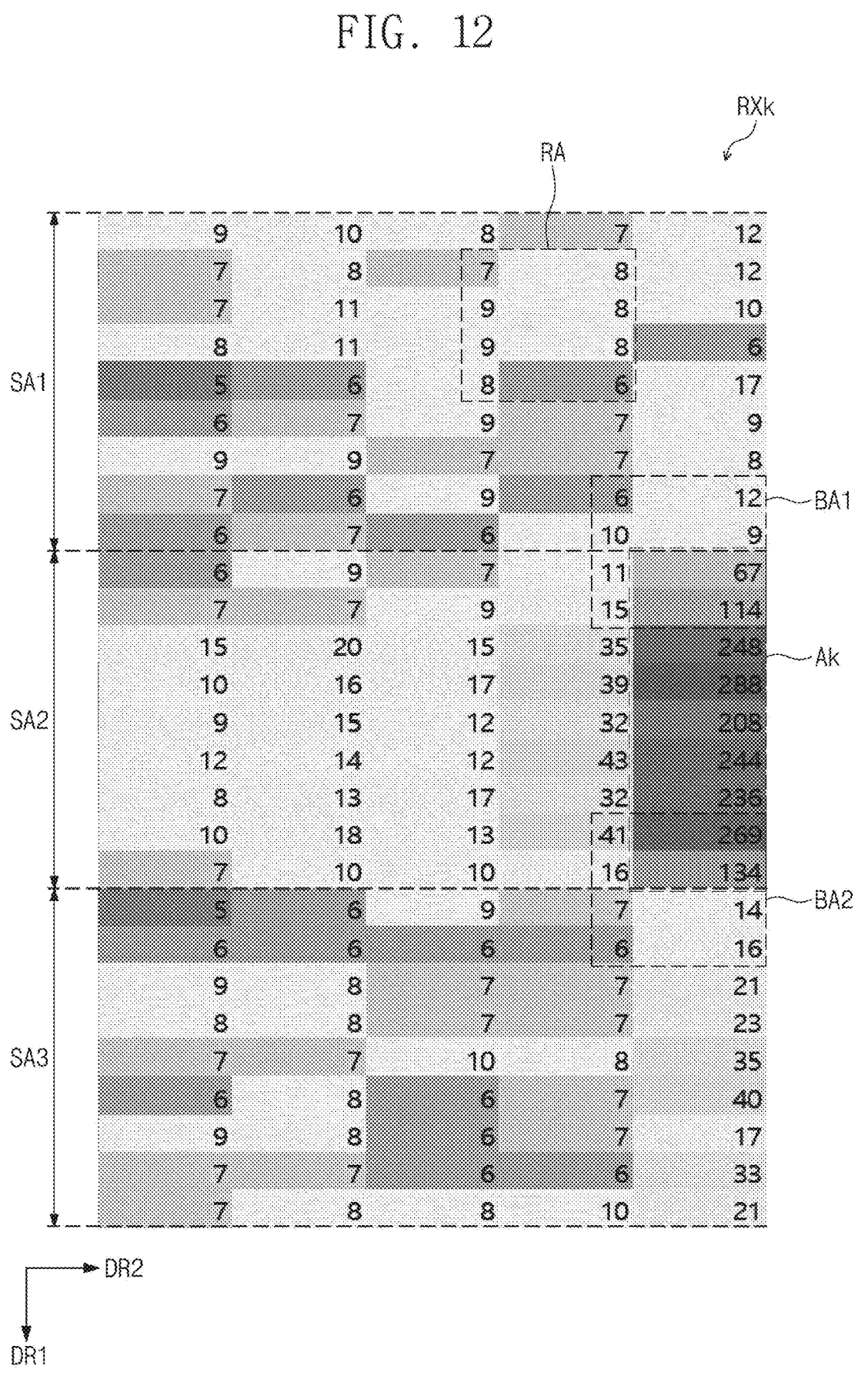

FIG. 12 is a diagram showing sensing signals RXk received from a partial area SAK of the sensor layer 200 illustrated in FIG. 11.

FIG. 12 shows the sensing signals RXk converted into digital values. The sensing signals RXk illustrated in FIG. 12 are only an example, and the present disclosure is not limited thereto.

Referring to FIGS. 11 and 12, sensing signals of a corresponding area Ak among the sensing signals RXk have greater values than sensing signals of other areas. Moreover, sensing signals respectively corresponding to boundary areas BA1 and BA2 have greater values than sensing signals of a reference area RA.

FIG. 12 illustrates that the reference area RA is located within the first sensing area SA1, but the present disclosure is not limited thereto. The reference area RA may be any location among the first to third sensing areas SA1, SA2, and SA3. However, the reference area RA may be suitably selected so as not to overlap the area Ak.

The boundary area BA1 overlaps a part of the first sensing area SA1 and a part of the second sensing area SA2. The boundary area BA2 overlaps a part of the second sensing area SA2 and a part of the third sensing area SA3.

Although FIG. 12 illustrates that each of the reference area RA and the boundary areas BA1 and BA2 has a size of 2×4, the present disclosure is not limited thereto. The sizes of the reference area RA and the boundary areas BA1 and BA2 may be variously changed.

Figure 13:
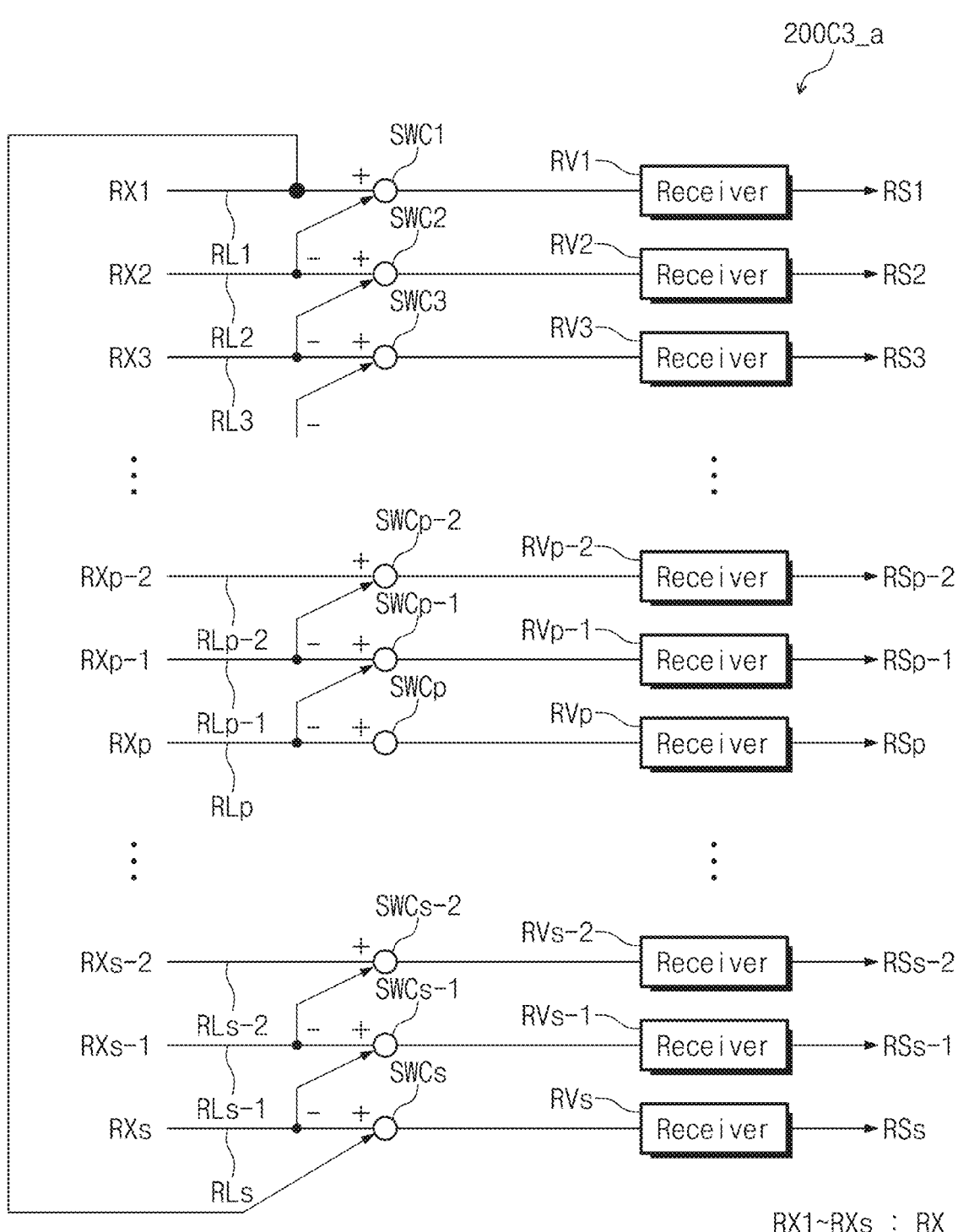
FIG. 13 is a block diagram of a reception circuit, according to one or more embodiments of the present disclosure.

FIG. 13 is a block diagram of a reception circuit 200C3_a, according to one or more embodiments of the present disclosure.

Referring to FIGS. 11 and 13, the reception circuit 200C3_a receives sensing signals RX1 to RXs from second signal wires RL1 to RLs and outputs reception signals RS1 to RSs. The sensing signal RX may include the sensing signals RX1 to RXs. Here, "s" is a positive integer.

In one or more embodiments, the sensing signals RX1 to RXs are analog signals, and the reception signals RS1 to RSs are digital signals.

The reception circuit 200C3_a includes switching circuits SWC1 to SWCs and receivers RV1 to RVs. In the example illustrated in FIG. 13, it is illustrated that the number of switching circuits SWC1 to SWCs is "s," and the number of receivers RV1 to RVs is "s" if the number of second signal wires RL1 to RLs is "s." However, the present disclosure is not limited thereto. The number of switching circuits SWC1 to SWCs included in the reception circuit 200C3_a and the number of receivers RV1 to RVs included in the reception circuit 200C3_a may be variously changed.

Each of the switching circuits SWC1 to SWCs delivers sensing signals received from two second corresponding signal wires among the second signal wires RL1 to RLs to a corresponding receiver among the receivers RV1 to RVs.

For example, the switching circuit SWC1 delivers the sensing signals RX1 and RX2 received from the second signal wires RL1 and RL2 of a first location, which are adjacent to each other, to the receiver RV1. The switching circuit SWC2 delivers the sensing signals RX2 and RX3 received from the second signal wires RL2 and RL3, which are adjacent to each other, to the receiver RV2. The switching circuit SWCp−1 delivers the sensing signals RXp−1 and RXp received from the second signal wires RLp−1 and RLp, which are adjacent to each other, to the receiver RVp−1. The switching circuit SWCs−1 delivers the sensing signals RXs−1 and RXs received from the second signal wires RLs−1 and RLs to the receiver RVs−1. The switching circuit SWCs delivers the sensing signals RXs and RX1 received from the second signal wires RLs and RL1 to the receiver RVs. In other words, the switching circuit SWCs delivers, to the receiver RVs, the sensing signal RX1 from the second signal wire RL1 of the first location and the sensing signal RXs from the second signal wire RLs of the second location.

Each of the receivers RV1 to RVs outputs a reception signal based on the sensing signals received through the corresponding receiver among the switching circuits SWC1 to SWCs.

For example, the receiver RV1 receives the sensing signals RX1 and RX2 through the switching circuit SWC1 and then outputs the reception signal RS1. The receiver RVp−1 receives the sensing signals RXp−1 and RXp through the switching circuit SWCp−1, and then outputs the reception signal RSp−1. The receiver RVs−1 receives the sensing signals RXs−1 and RXs through the switching circuit SWCs−1 and then outputs the reception signal RSs−1. The receiver RVs receives the sensing signals RXs and RX1 through the switching circuits SWCs, and then outputs the reception signal RSs.

In one or more embodiments, each of the switching circuits SWC1 to SWCs may operate as a switching element that sequentially delivers sensing signals received from two second signal wires to a corresponding receiver among the receivers RV1 to RVs.

If each of the switching circuits SWC1 to SWCs operates as a switching element, the receivers RV1 to RVs may output the reception signals RS1 to RSs corresponding to differences between received sensing signals.

In one or more embodiments, each of the switching circuits SWC1 to SWCs may operate as a differential amplifier that delivers a signal corresponding to a difference between sensing signals received from two second signal wires to a corresponding receiver among the receivers RV1 to RVs.

If each of the switching circuits SWC1 to SWCs operates as a differential amplifier, the receivers RV1 to RVs may output the reception signals RS1 to RSs corresponding to differences between sensing signals.

Figure 14:
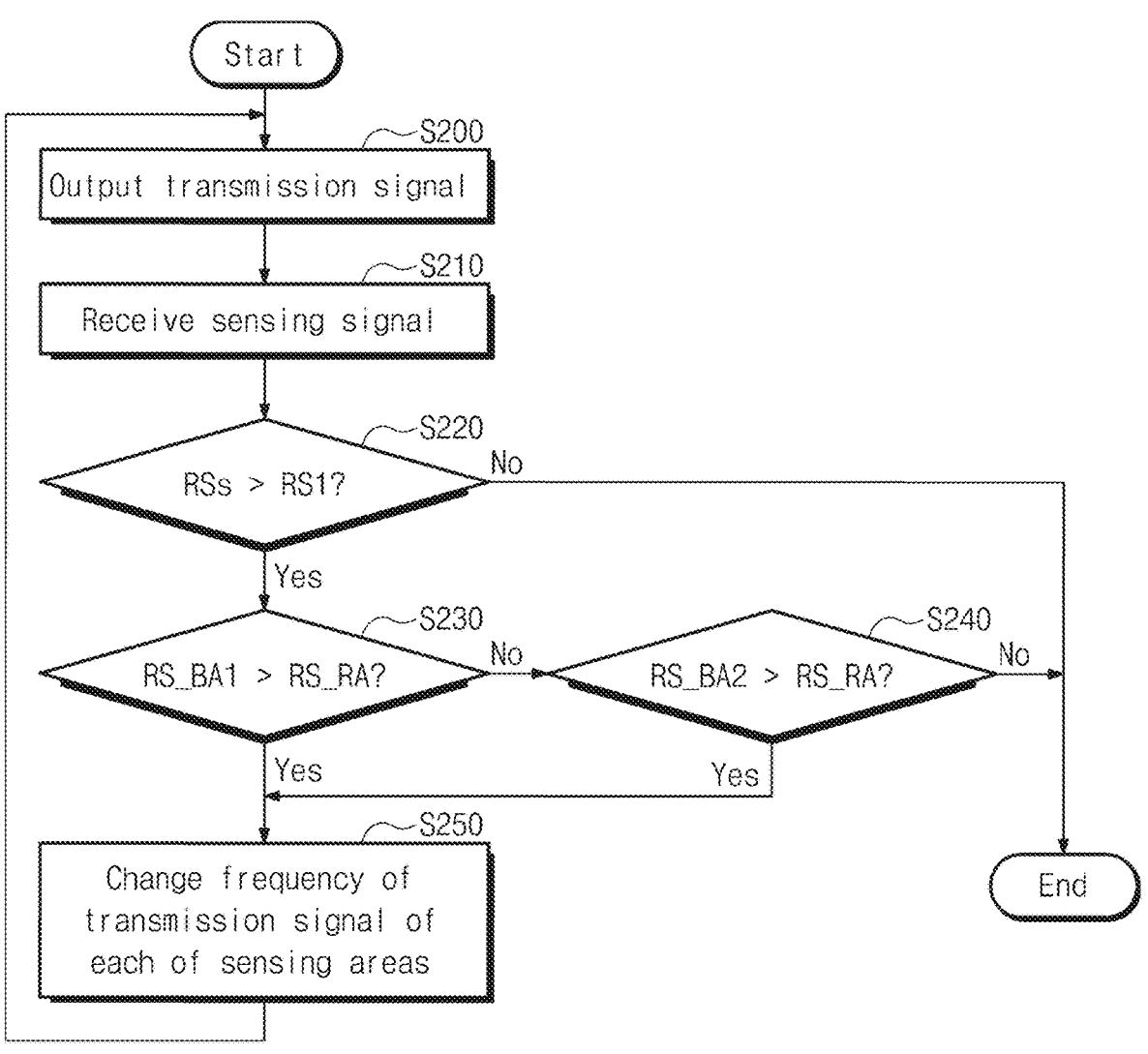
FIG. 14 is a flowchart for describing a noise test operation of a sensor driver, according to one or more embodiments of the present disclosure.

FIG. 14 is a flowchart for describing a noise test operation of the sensor driver 200C, according to one or more embodiments of the present disclosure.

Referring to FIGS. 6, 11, 12, 13, and 14, the sensor driver 200C outputs the transmission signals TX to the sensor layer 200 (operation S200).

In one or more embodiments, the sensor driver 200C may provide the first transmission signals TX_SA1 to the first sensing area SA1, may provide the second transmission signals TX_SA2 to the second sensing area SA2, and may output the third transmission signals TX_SA3 to the third sensing area SA3.

In one or more embodiments, the frequency of the first transmission signals TX_SA1, the frequency of the second transmission signals TX_SA2, and the frequency of the third transmission signals TX_SA3 may be the same as or different from each other.

The sensor driver 200C receives the sensing signals RX from the sensor layer 200 (operation S210).

The sensor driver 200C outputs reception signals based on the sensing signals RX. The sensor driver 200C may determine the noise included in the sensing signals RX based on the reception signals.

In the example shown in FIG. 12, the sensing signal of the area Ak has a greater value than those of other areas.

The sensor driver 200C may output reception signals based on the sensing signals RX by an operation of the reception circuit 200C3 as shown in FIG. 9.

The sensor driver 200C determines whether the reception signal RSs is greater than the reception signal RS1 (operation S220). In one or more embodiments, the reception signal RS1 is a reference reception signal.

If the reception signal RSs is less than or equal to the reception signal RS1, the noise test operation of the sensor driver 200C may be terminated.

If the reception signal RSs is greater than the reception signal RS1, the sensor driver 200C determines that a noise level of the area Ak far from the connection area CNA is relatively high.

The sensor driver 200C compares reception signals in the reference area RA with reception signals in the boundary area BA1 (operation S230). In one or more embodiments, the sensor driver 200C may compare a representative value (hereinafter referred to as "RS_RA") of the reception signals in the reference area RA with a representative value (hereinafter referred to as "RS_BA1") of the reception signals in the boundary area BA1.

The representative value RS_RA of the reception signals in the reference area RA and the representative value RS_BA1 of the reception signals in the boundary area BA1 may be any one of, for example, a mean value, a median value, a mode value, a maximum value, a minimum value, a difference value between the maximum value and the minimum value, or a standard deviation.

If the representative value RS_BA1 of the reception signals in the boundary area BA1 is greater than the representative value RS_RA of the reception signals in the reference area RA, the sensor driver 200C changes the frequency of the transmission signal of each of the first to third sensing areas SA1, SA2, and SA3 (operation S250). The control operation of the sensor driver 200C returns to operation S200.

If the representative value RS_BA1 of the reception signals in the boundary area BA1 is less than or equal to the representative value RS_RA of the reception signals in the reference area RA, the sensor driver 200C compares the representative value RS_RA (hereinafter referred to as RS_BA2) of the reception signals in the boundary area BA2 with the representative value RS_RA of the reception signals in the reference area RA (operation S240).

If the representative value RS_BA2 of the reception signals in the boundary area BA2 is greater than the representative value RS_RA of the reception signals in the reference area RA, the sensor driver 200C changes the frequency of the transmission signal of each of the first to third sensing areas SA1, SA2, and SA3 (operation S250). The control operation of the sensor driver 200C returns to operation S200.

If a representative value RS_BA2 of the reception signals in the boundary area BA2 is less than or equal to the representative value RS_RA of the reception signals in the reference area RA, the noise test operation of the sensor driver 200C may be terminated.

Figure 15:
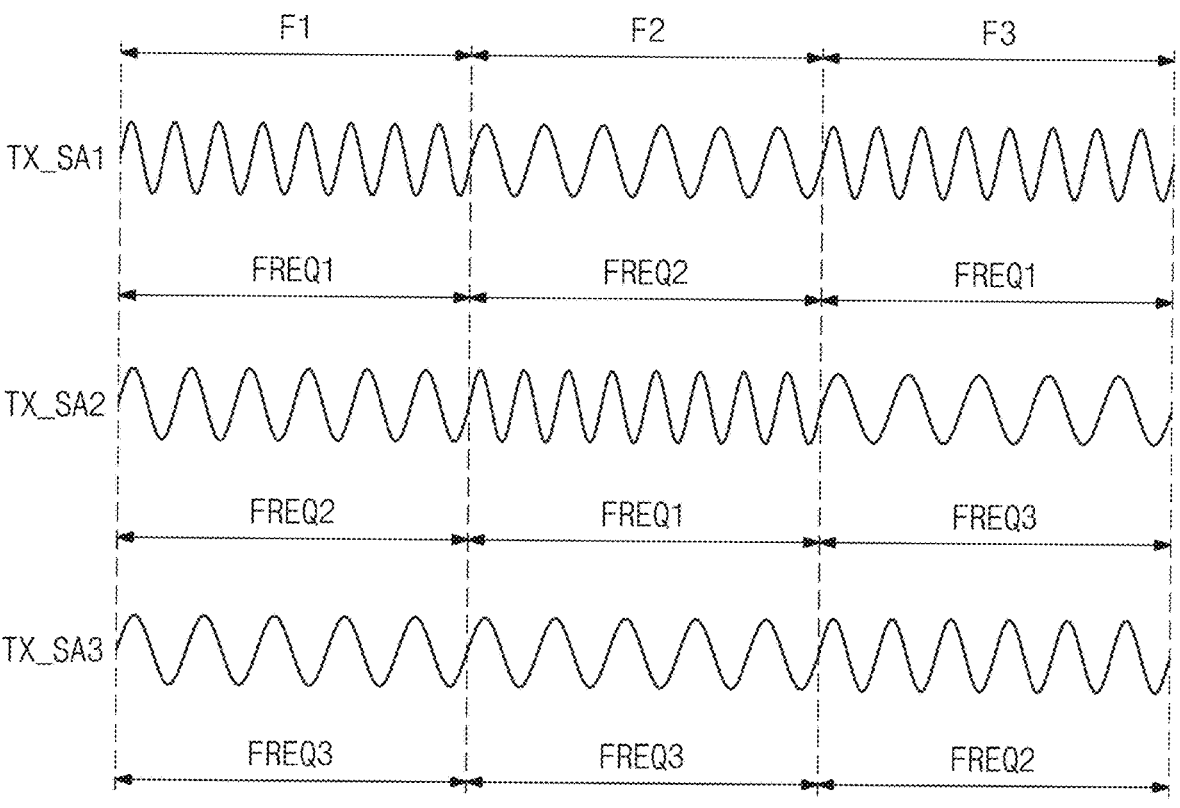
FIG. 15 is a diagram showing a first transmission signals, a second transmission signals, and a third transmission signals provided to a first sensing area, a second sensing area, and a third sensing area illustrated in FIG. 11.

FIG. 15 is a diagram showing the first transmission signals TX_SA1, the second transmission signals TX_SA2, and the third transmission signals TX_SA3 provided to the first sensing area SA1, the second sensing area SA2, and the third sensing area SA3 illustrated in FIG. 11.

Referring to FIGS. 11, 12 and 15, the first, second, and third transmission signals TX_SA1, TX_SA2, and TX_SA3 provided to the first, second, and third sensing areas SA1, SA2, and SA3 during a first frame F1 may respectively have a first transmission frequency FREQ1, a second transmission frequency FREQ2, and a third transmission frequency FREQ3.

If at least one representative value among a representative value of reception signals in the boundary area BA1 and a representative value of reception signals in the boundary area BA2 is greater than a representative value of reception signals in the reference area RA, the transmission frequency of at least one of the first, second, or third transmission signals TX_SA1, TX_SA2, or TX_SA3 may be changed.

The first, second, and third transmission signals TX_SA1, TX_SA2, and TX_SA3 provided to the first, second, and third sensing areas SA1, SA2, and SA3 during a second frame F2 may respectively have the second transmission frequency FREQ2, the first transmission frequency FREQ1 and the third transmission frequency FREQ3.

If at least one representative value among the representative value of the reception signals in the boundary area BA1 and the representative value of the reception signals in the boundary area BA2 is greater than a representative value of reception signals in the reference area RA, the transmission frequency of at least one of the first, second, or third transmission signals TX_SA1, TX_SA2, or TX_SA3 may be changed.

The first, second, and third transmission signals TX_SA1, TX_SA2, and TX_SA3 provided to the first, second, and third sensing areas SA1, SA2, and SA3 during a third frame F3 may respectively have the first transmission frequency FREQ1, the third transmission frequency FREQ3 and the second transmission frequency FREQ2.

If at least one representative value among the representative values of the reception signals in the boundary area BA1 and the representative values of the reception signals in the boundary area BA2 is greater than the representative value of the reception signals of the reference area RA, the transmission frequencies of the first, second, and third transmission signals TX_SA1, TX_SA2, and TX_SA3 may be changed in a preset order or randomly.

Figure 16:
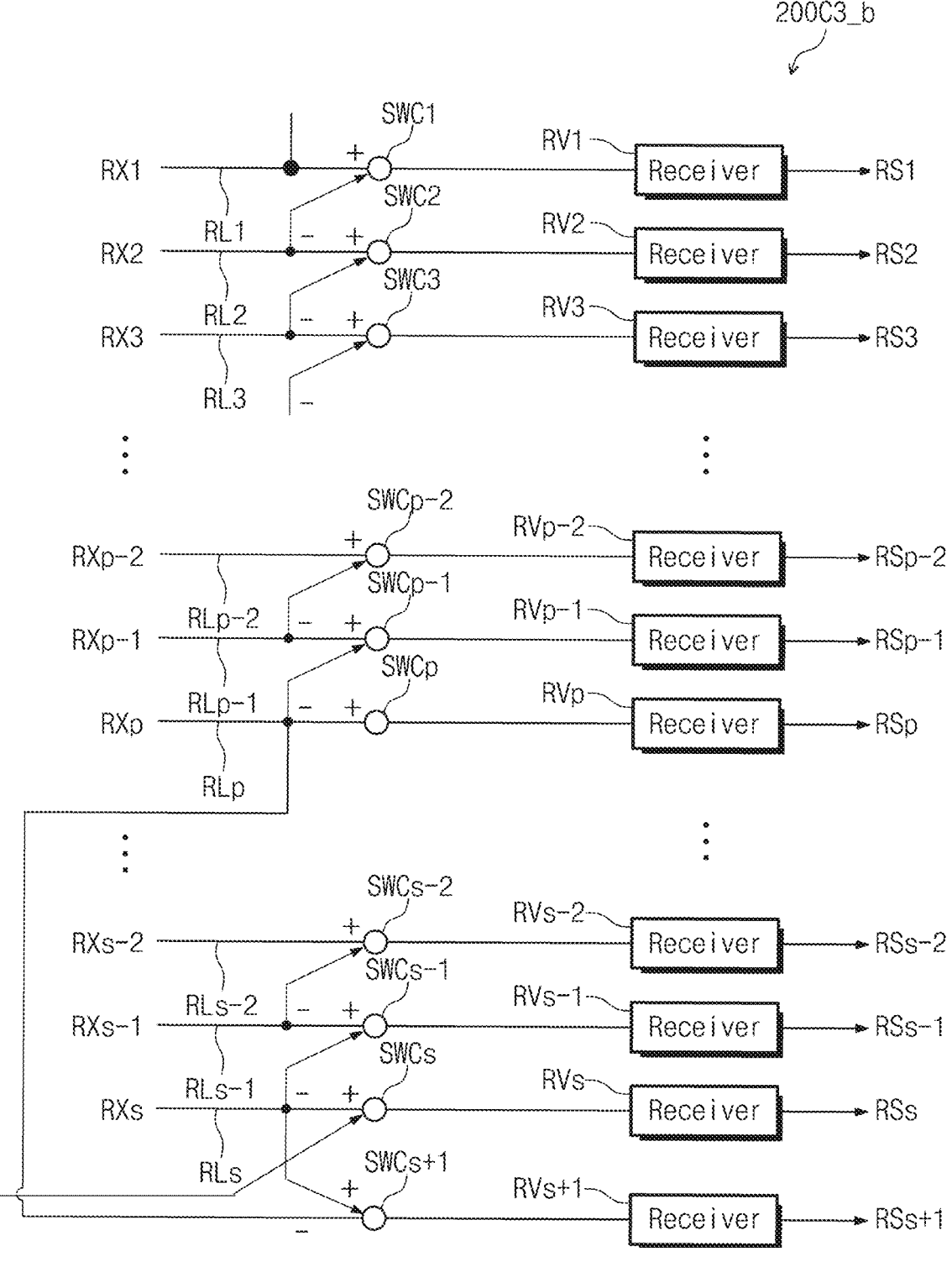
FIG. 16 is a block diagram of a reception circuit, according to one or more embodiments of the present disclosure.

FIG. 16 is a block diagram of a reception circuit 200C3_b, according to one or more embodiments of the present disclosure.

Referring to FIGS. 11 and 16, the reception circuit 200C3_b receives the sensing signals RX1 to RXs from the second signal wires RL1 to RLs and outputs reception signals RS1 to RSs+1. The sensing signal RX may include the sensing signals RX1 to RXs. Here, "s" is a positive integer.

In one or more embodiments, the sensing signals RX1 to RXs are analog signals, and the reception signals RS1 to RSs+1 are digital signals.

The reception circuit 200C3_b includes switching circuits SWC1 to SWCs+1 and receivers RV1 to RVs+1. In the example illustrated in FIG. 16, it is illustrated that the number of switching circuits SWC1 to SWCs+1 is "s+1" and the number of receivers RV1 to RVs+1 is "s+1" if the number of second signal wires RL1 to RLs is "s". However, the present disclosure is not limited thereto. The number of switching circuits SWC1 to SWCs+1 included in the reception circuit 200C3_b and the number of receivers RV1 to RVs+1 included in the reception circuit 200C3_b may be variously changed.

Each of the switching circuits SWC1 to SWCs+1 delivers sensing signals received from two second corresponding signal wires among the second signal wires RL1 to RLs to a corresponding receiver among the receivers RV1 to RVs+1.

For example, the switching circuit SWC1 delivers the sensing signals RX1 and RX2 received from the second signal wires RL1 and RL2, which are adjacent to each other, to the receiver RV1. The switching circuit SWC2 delivers the sensing signals RX2 and RX3 received from the second signal wires RL2 and RL3, which are adjacent to each other, to the receiver RV2. The switching circuit SWCp−1 delivers the sensing signals RXp−1 and RXp received from the second signal wires RLp−1 and RLp, which are adjacent to each other, to the receiver RVp−1. The switching circuit SWCs−1 delivers the sensing signals RXs−1 and RXs received from the second signal wires RLs−1 and RLs to the receiver RVs−1. The switching circuit SWCs delivers the sensing signals RXs and RX1 received from the second signal wires RLs and RL1 to the receiver RVs. The switching circuit SWCs+1 delivers the sensing signals RXs and RXp received from the second signal wires RLs and RLp to the receiver RVs+1.

Each of the receivers RV1 to RVs+1 outputs a reception signal based on the sensing signals received through the corresponding receiver among the switching circuits SWC1 to SWCs+1.

For example, the receiver RV1 receives the sensing signals RX1 and RX2 through the switching circuit SWC1 and then outputs the reception signal RS1. The receiver RVp−1 receives the sensing signals RXp−1 and RXp through the switching circuit SWCp−1 and then outputs the reception signal RSp−1. The receiver RVs−1 receives the sensing signals RXs−1 and RXs through the switching circuit SWCs−1 and then outputs the reception signal RSs−1. The receiver RVs receives the sensing signals RXs and RX1 through the switching circuits SWCs and then outputs the reception signal RSs. The receiver RVs+1 receives the sensing signals RXs and RXp through the switching circuit SWCs+1 and then outputs the reception signal RSs+1.

In one or more embodiments, each of the switching circuits SWC1 to SWCs+1 may operate as a switching element that sequentially delivers sensing signals received from two second signal wires to a corresponding receiver among the receivers RV1 to RVs+1.

If each of the switching circuits SWC1 to SWCs+1 operates as a switching element, the receivers RV1 to RVs+1 may output the reception signals RS1 to RSs+1 corresponding to differences between received sensing signals.

In one or more embodiments, each of the switching circuits SWC1 to SWCs+1 may operate as a differential amplifier that delivers a signal corresponding to a difference between sensing signals received from two second signal wires to a corresponding receiver among the receivers RV1 to RVs+1.

If each of the switching circuits SWC1 to SWCs+1 operates as a differential amplifier, the receivers RV1 to RVs+1 may output the reception signals RS1 to RSs+1 corresponding to differences between sensing signals.

As the size of the electronic device 1000 (see FIG. 1) increases, the length of the sensor layer 200 in the second direction DR2 increases.

The sensor driver 200C may determine external noise based on not only the reception signal RSs corresponding to a difference of the sensing signals RXs+1 and RS1 but also the reception signal RSs+1 corresponding to a difference of the sensing signals RXs and RSp.

In other words, when the reception signal RSs is greater than the reception signal RS1, the sensor driver 200C changes the frequency of the transmission signal TX. Moreover, when the reception signal RSp is greater than the reception signal RS1, the sensor driver 200C changes the frequency of the transmission signal TX. As a result, the input-sensing performance of the input sensor provided in an electronic device may be improved.

Although described above with reference to one or more embodiments, it will be understood by those skilled in the art that various modifications and changes may be made in the present disclosure without departing from the spirit and scope of the present disclosure as set forth in the claims below. Furthermore, embodiments of the present disclosure are not intended to limit the technical spirit of the present disclosure. All aspects within the scope of the following claims and all equivalents thereof should be construed as being included within the scope of the present disclosure.

An input sensor having such a configuration may change frequencies of transmission signals provided to transmission electrodes based on signals received from reception electrodes. As a result, the input-sensing performance of the input sensor provided in an electronic device may be improved.

While the present disclosure has been described with reference to embodiments thereof, it will be apparent to those of ordinary skill in the art that various changes and modifications may be made thereto without departing from the spirit and scope of the present disclosure as set forth in the following claims, with functional equivalents thereof to be included therein.

What is claimed is:

1. An input sensor comprising:
a sensor layer comprising first electrodes and second electrodes; and
a sensor driver electrically connected to the second electrodes, and configured to:
provide transmission signals to the first electrodes;
output a first reception signal based on sensing signals received from a pair of the second electrodes of a first location, which are adjacent to each other;
output a second reception signal based on one of the sensing signals received from one of the pair of the second electrodes of the first location, and another sensing signal received from another one of the second electrodes of a second location; and
change a frequency of the transmission signals based on the first reception signal and the second reception signal.

2. The input sensor of claim 1, wherein the sensor driver comprises:
a first switching circuit configured to sequentially output the sensing signals received from the pair of the second electrodes of the first location; and
a first receiver configured to output the first reception signal corresponding to a difference between the sensing signals output by the first switching circuit.

3. The input sensor of claim 2, wherein the sensor driver further comprises:
a second switching circuit configured to sequentially output signals comprising the one of the sensing signals received from the one of the pair of the second electrodes of the first location and the another sensing signal received from the another one of the second electrodes of the second location; and
a second receiver configured to output the second reception signal corresponding to a difference between the signals output by the second switching circuit.

4. The input sensor of claim 3, wherein the sensor driver is configured to change the frequency of the transmission signals when the second reception signal is greater than the first reception signal.

5. The input sensor of claim 3, wherein the sensor driver further comprises:
a third switching circuit configured to sequentially output other signals comprising the another sensing signal received from the another one of the second electrodes of the second location and an additional sensing signal received from an additional one of the second electrodes of a third location; and
a third receiver configured to output a third reception signal corresponding to a difference between the other signals output by the third switching circuit, and
wherein the third location is between the first location and the second location.

6. The input sensor of claim 1, wherein the sensing signals are analog signals, and wherein the first reception signal and the second reception signal comprise digital signals.

7. The input sensor of claim 1, wherein the sensor driver further comprises:

a signal generation circuit configured to output the transmission signals;

a reception circuit configured to receive the sensing signals from the second electrodes, and to output the first reception signal and the second reception signal based on the sensing signals; and a sensor controller configured to control the signal generation circuit such that the frequency of the transmission signals is changed based on the first reception signal and the second reception signal.

8. The input sensor of claim 1, wherein the sensor layer comprises a first sensing area and a second sensing area, wherein the sensor driver is configured to provide first transmission signals to the first sensing area, and is configured to provide second transmission signals to the second sensing area, wherein the first transmission signals have a first transmission frequency, and wherein the second transmission signals have a second transmission frequency that is different from the first transmission frequency.

9. The input sensor of claim 8, wherein the sensor driver is configured to change the frequency of the transmission signals when the second reception signal is greater than the first reception signal based on the sensing signals received from reference area second electrodes of the second electrodes in a reference area and the sensing signals received from boundary area second electrodes of the second electrodes in a boundary area, and wherein the boundary area overlaps a part of the first sensing area and a part of the second sensing area.

10. The input sensor of claim 9, wherein the sensor driver is configured to change at least one frequency of the first transmission frequency and the second transmission frequency when the second reception signal is greater than the first reception signal and when a representative value of the sensing signals received from the boundary area second electrodes is greater than a representative value of the sensing signals received from the reference area second electrodes.

11. An electronic device comprising:

a display layer configured to display an image;

a sensor layer above the display layer, and first electrodes and second electrodes; and a sensor driver electrically connected to the second electrodes, and configured to:

provide transmission signals to the first electrodes;

output a first reception signal based on sensing signals received from a pair of the second electrodes of a first location, which are adjacent to each other;

output a second reception signal based on one of the sensing signals received from one of the pair of the second electrodes of the first location, and another sensing signal received from another one of the second electrodes of a second location; and change a frequency of the transmission signals based on the first reception signal and the second reception signal.

12. The electronic device of claim 11, wherein the sensor driver comprises:

a first switching circuit configured to sequentially output the sensing signals received from the pair of the second electrodes of the first location; and a first receiver configured to output the first reception signal corresponding to a difference between the sensing signals output by the first switching circuit.

13. The electronic device of claim 12, wherein the sensor driver further comprises:

a second switching circuit configured to sequentially output signals comprising the one of the sensing signals received from the one of the pair of the second electrodes of the first location and the another sensing signal received from the another one of the second electrodes of the second location; and a second receiver configured to output the second reception signal corresponding to a difference between the signals output by the second switching circuit.

14. The electronic device of claim 13, wherein the sensor driver is configured to change the frequency of the transmission signals when the second reception signal is greater than the first reception signal.

15. The electronic device of claim 13, wherein the sensor driver further comprises:

a third switching circuit configured to sequentially output other signals comprising the another sensing signal received from the another one of the second electrodes of the second location and an additional sensing signal received from an additional one of the second electrodes of a third location; and a third receiver configured to output a third reception signal corresponding to a difference between the other signals output by the third switching circuit, and wherein the third location is between the first location and the second location.

16. The electronic device of claim 11, wherein first ends of second signal wires are electrically connected to the sensor driver, wherein the first location is adjacent to the first ends of the second signal wires, and wherein the second location is not adjacent to the first ends of the second signal wires.

17. The electronic device of claim 11, wherein the sensor driver further comprises:

a signal generation circuit configured to output the transmission signals;

a reception circuit configured to receive the sensing signals from the second electrodes, and to output the first reception signal and the second reception signal based on the sensing signals; and a sensor controller configured to control the signal generation circuit such that the frequency of the transmission signals is changed based on the first reception signal and the second reception signal.

18. The electronic device of claim 11, wherein the sensor layer comprises a first sensing area and a second sensing area, wherein the sensor driver is configured to provide first transmission signals to the first sensing area, and is configured to provide second transmission signals to the second sensing area, wherein the first transmission signals have a first transmission frequency, and wherein the second transmission signals have a second transmission frequency that is different from the first transmission frequency.

19. The electronic device of claim 18, wherein the sensor driver is configured to change the frequency of the transmission signals when the second reception signal is greater than the first reception signal based on the sensing signals received from reference area second electrodes of the second electrodes in a reference area and the sensing signals received from boundary area second electrodes of the second electrodes in a boundary area, and wherein the boundary area overlaps a part of the first sensing area and a part of the second sensing area.

20. The electronic device of claim 19, wherein the sensor driver is configured to change at least one frequency of the first transmission frequency and the second transmission frequency when the second reception signal is greater than the first reception signal and when a representative value of the sensing signals received from the boundary area second electrodes is greater than a representative value of the sensing signals received from the reference area second electrodes.

\* \* \* \* \*